United States Patent [19]
Dudonis

[11] 4,031,324
[45] June 21, 1977

[54] AUTOMATED COIN ARRANGEMENT PROVIDING INTERFERENCE FREE COIN DEPOSIT DETECTION DURING ANNOUNCEMENTS

[75] Inventor: Ronald Michael Dudonis, Englishtown, N.J.

[73] Assignee: Bell Telephone Laboratories, Incorporated, Murray Hill, N.J.

[22] Filed: May 24, 1976

[21] Appl. No.: 689,600

[52] U.S. Cl. .................................. 179/6.3 R
[51] Int. Cl.² ..................................... H04M 17/00
[58] Field of Search ............ 179/6.3 R, 6.4, 6.31, 179/6.5, 27 FF, 2 DP, 12, 27 FB

[56] References Cited
UNITED STATES PATENTS

| | | |
|---|---|---|
| 2,676,209 | 4/1954 | Joel, Jr. ........................ 179/6.3 R |
| 2,761,900 | 9/1956 | Joel, Jr. ........................ 179/6.3 R |
| 3,069,502 | 12/1962 | Edstrom et al. ............... 179/6.3 R |
| 3,453,389 | 7/1969 | Shaer ............................... 179/12 |

Primary Examiner—Kathleen H. Claffy
Assistant Examiner—Gerald L. Brigance
Attorney, Agent, or Firm—Martin S. Landis

[57] ABSTRACT

A system is disclosed for serving coin telephone calls on a wholly automatic basis without any operator intervention normally being required either for notifying the calling party of the required deposits or for monitoring the collection of coins deposited in the coin station. Moreover, coin tone detectors and announcement circuits are isolated so that coin deposits can be detected during announcements.

19 Claims, 41 Drawing Figures

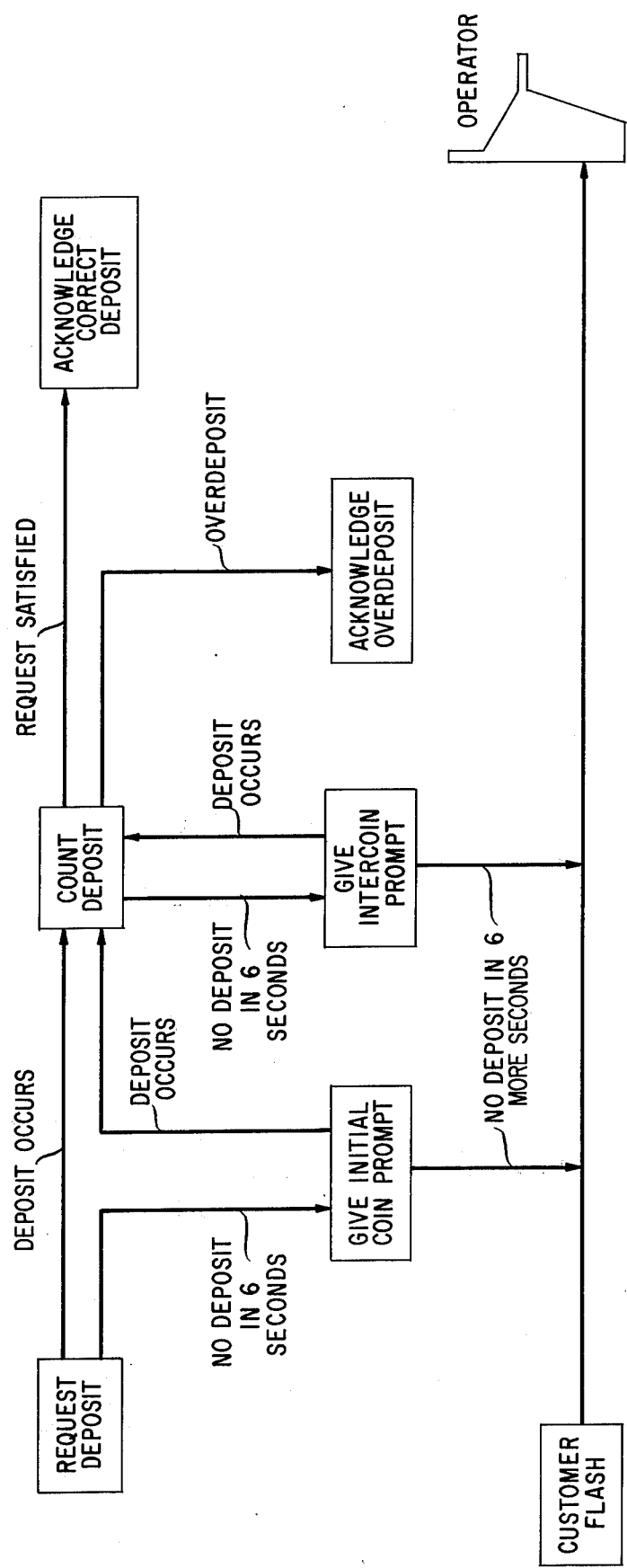

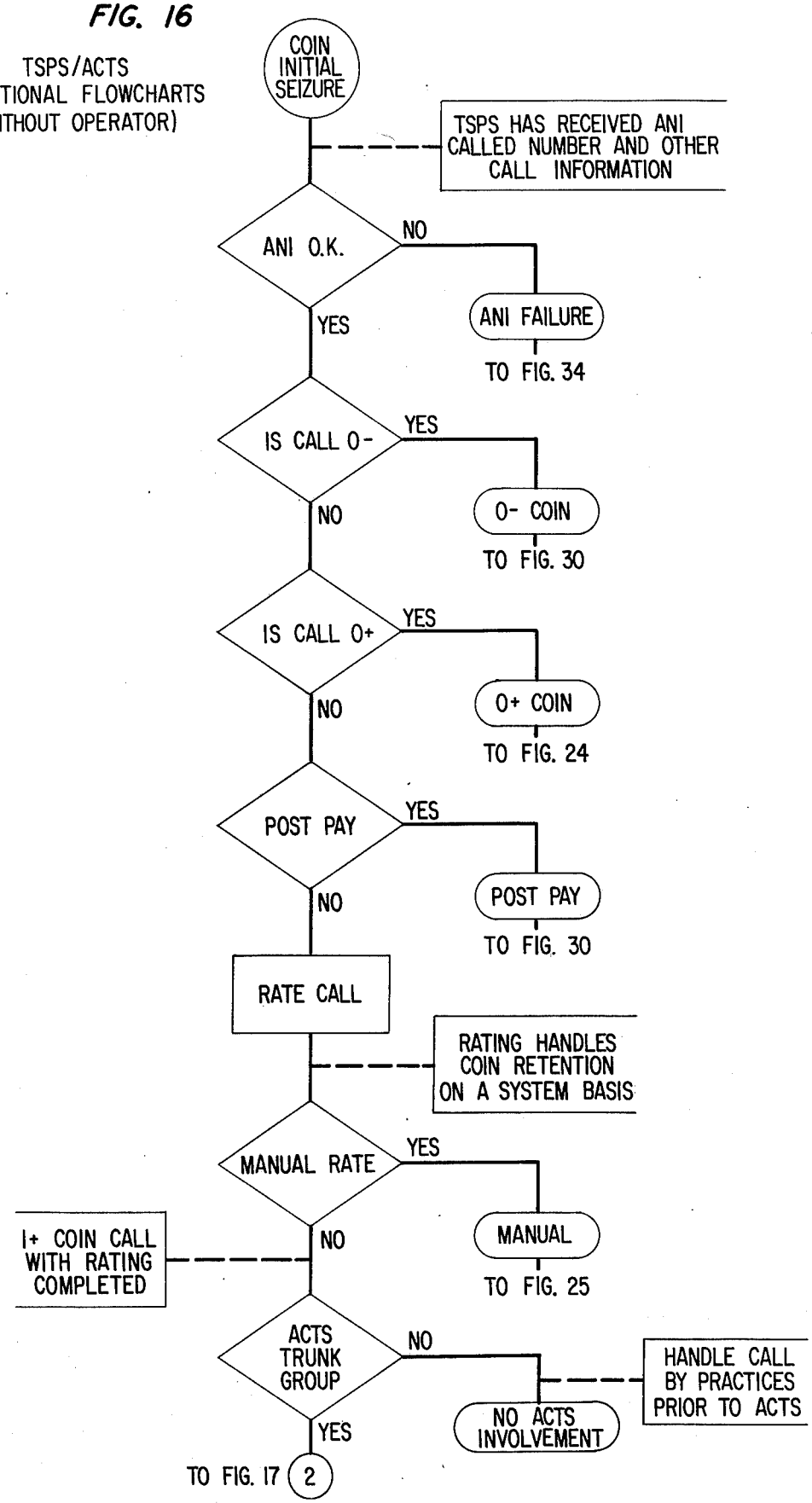

TSPS/ACTS FUNCTIONAL FLOWCHARTS
(WITH OPERATOR)

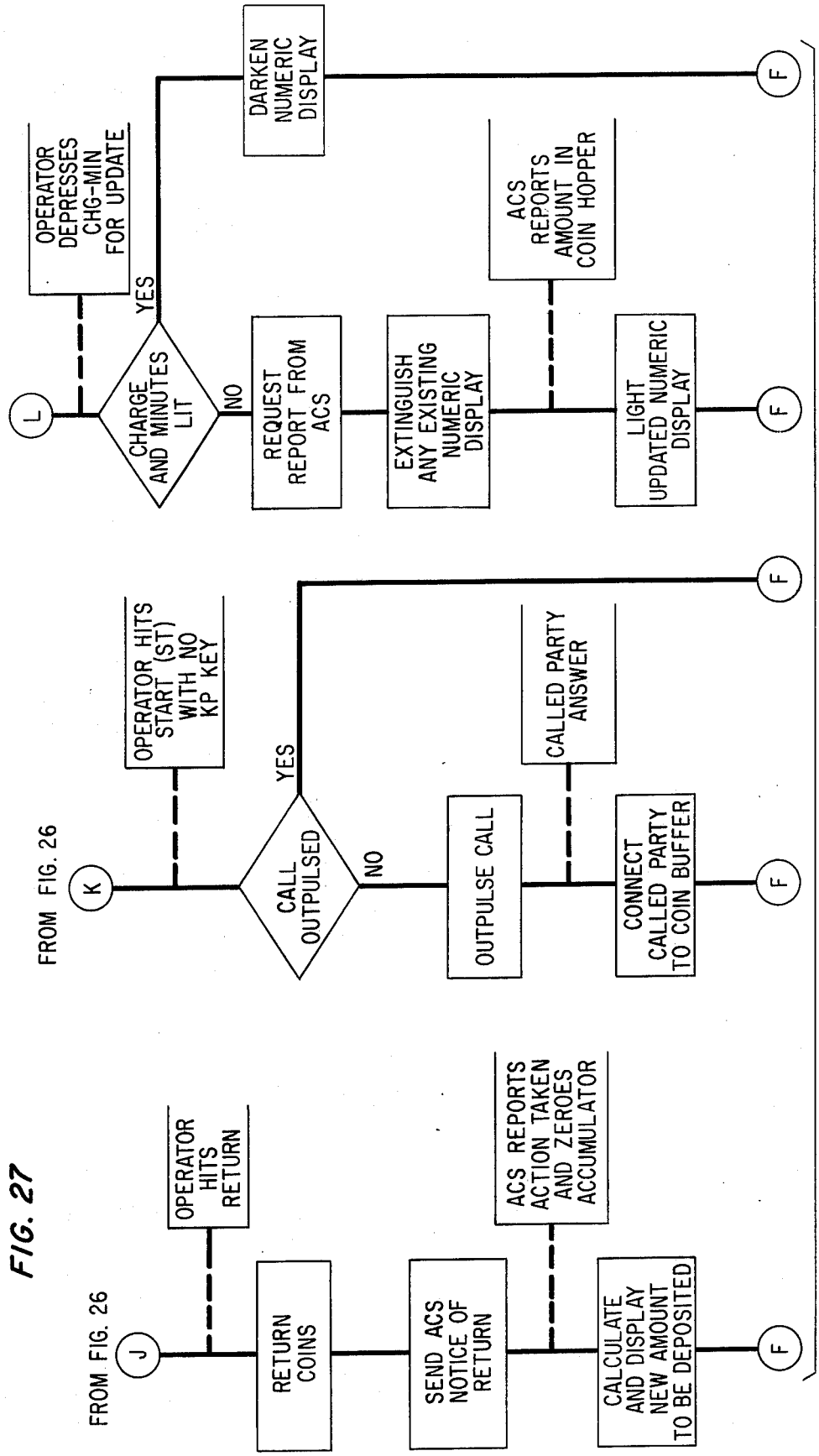

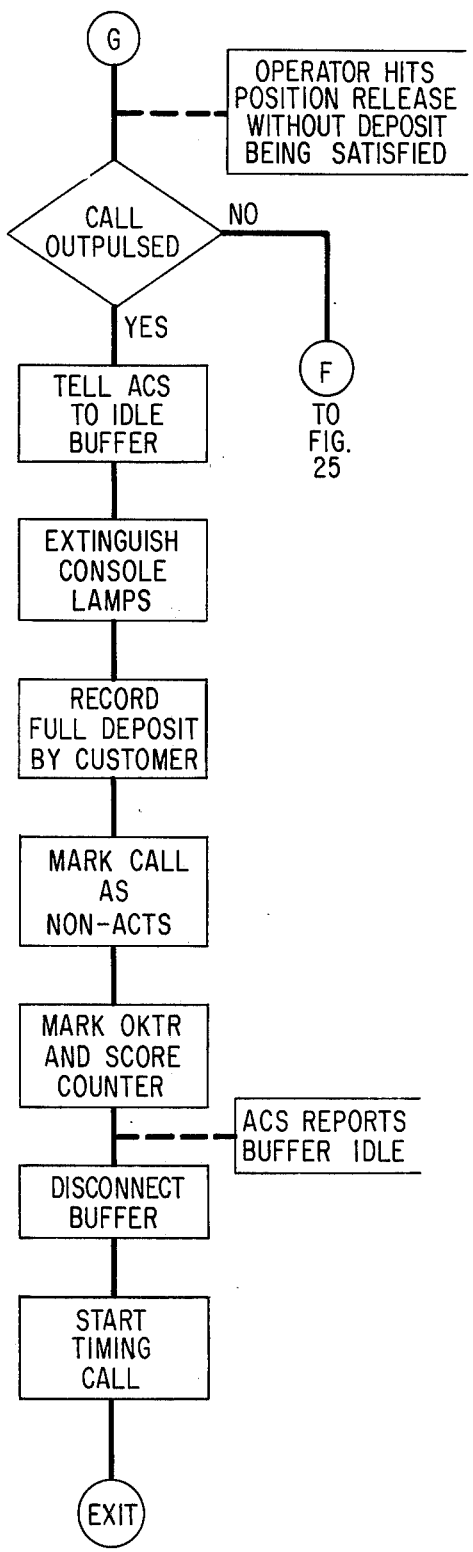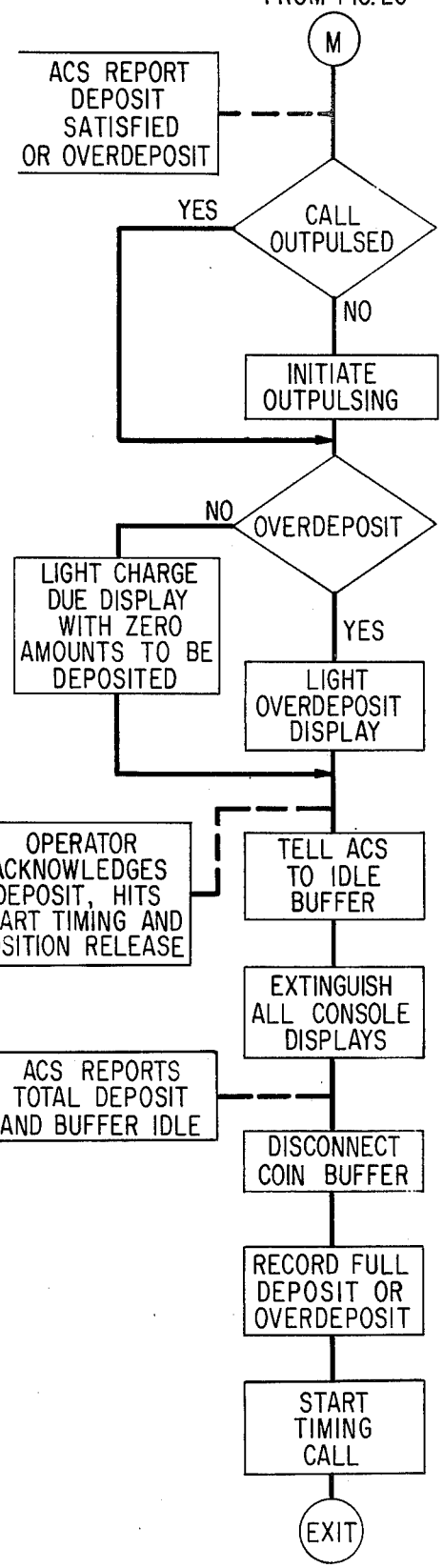

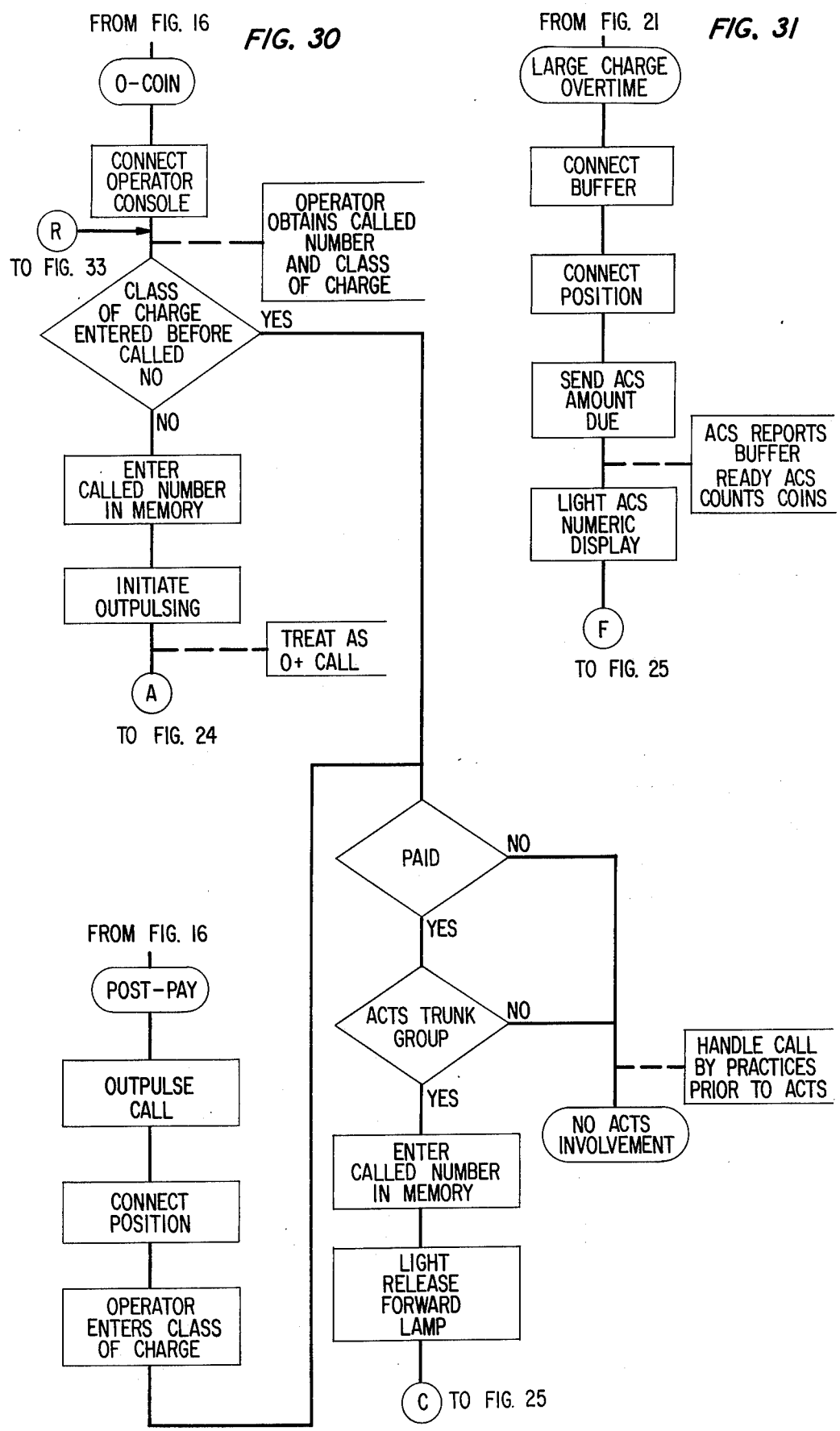

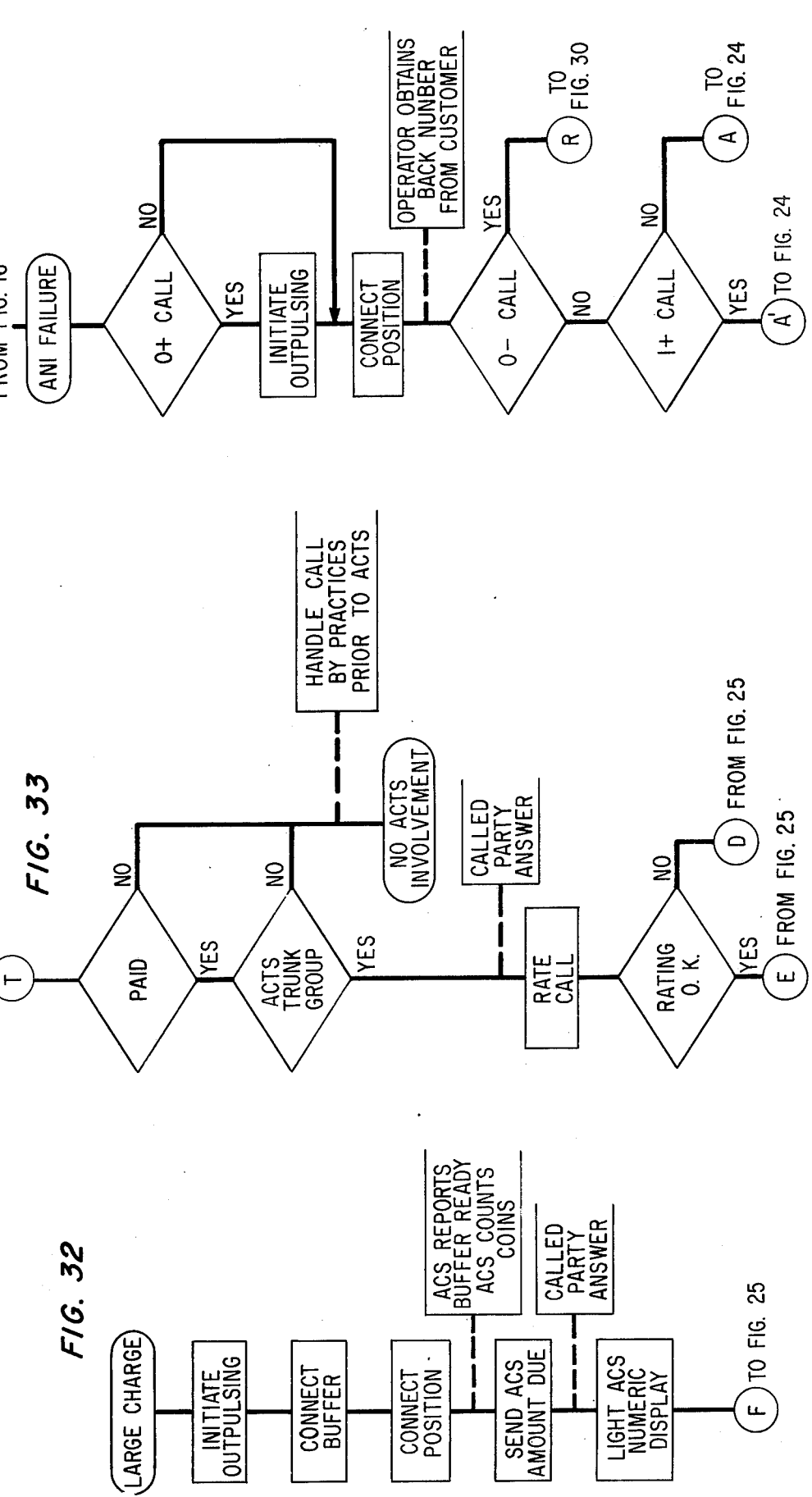

FUNCTIONAL FLOWCHART OF ACTS

AUTOMATED COIN ARRANGEMENT PROVIDING INTERFERENCE FREE COIN DEPOSIT DETECTION DURING ANNOUNCEMENTS

FIELD OF THE INVENTION

This invention relates to telecommunication systems and, more specifically, to such systems having improved facilities for serving customer-dialed toll calls originating at coin pay stations.

BACKGROUND OF THE INVENTION AND PRIOR ART

Improvements in the field of telephony during the last quarter century have permitted an increasing number of telephone calls to be served on a fully automated or partially automated basis. These improvements have resulted in better customer service while at the same time allowing the more economical provision of telephone services.

Some of these improvements concern serving toll calls orginated at coin pay stations with a minimum of operator intervention.

One such prior art system is disclosed in A. E. Joel, Jr. U.S. Pat. No. 2,676,209, issued Apr. 20, 1954. In this system a plurality of magnetic tape telegraphones provided coin deposit request announcements. Each coin station included signal generators controlled by coin deposits for generating distinct combinations of two frequencies which identified the type of coin deposited (i.e., nickel, dime, or quarter). More specifically, at the beginning of a call, a selected one of the telegraphones was enabled to provide a message to the calling coin subscriber indicating, for example, "Please deposit 10 cents." Responsive to this announcement, the calling subscriber would deposit a dime or two nickels and then the appropriate dual frequency tones would be generated in the coin station and conveyed to a coin tone detector at the serving telephone office which would accumulate the amount deposited as indicated by the received dual frequency tones. When the requisite deposits were detected, the call was completed. Thus, no operator intervention was normally required; however, if an insufficient deposit was received, then a monitoring operator was connected to the calling subscriber to resolve any problem which apparently arose. This system appears to be effective; however, it failed to satisfactorily deal with the problem of detecting coins deposited during automated announcements. If a subscriber deposited a coin during an announcement, then the coin might not be detected by the coin tone detector because of interfering voice signals from the announcement circuit. Moreover, the announcement could possibly inadvertently trip the coin tone detector.

Another automated coin system is described in A. E. Joel, Jr. U.S. Pat. No. 2,761,900, issued Sept. 4, 1956. This system is an improvement on the above-mentioned Joel patent and provided means for recalling the calling party at the termination of a coin call to collect overtime deposits. Also provided were means for changing the charge rates for different telephone calls during the duration of present call connections. This system also suffered from the same disadvantage as its predecessor—i.e., potential interference between announcements and the detection of coin tones indicative of coin deposits.

Another fully automated coin system is disclosed in N. R. Shaer U.S. Pat No. 3,453,389, July 1, 1969. The Shaer system is incorporated in a larger, partially automated traffic service position systems (TSPS) disclosed in R. J. Jaeger-A. E. Joel, Jr. U.S. Pat. No. 3,484,560, issued Dec. 16, 1966. In the Jaeger-Joel arrangement, a plurality of trunk circuits are provided intermediate to a local office and a toll office. Incoming coil calls on these trunk circuits requiring operator intervention are routed to an operator via a switching network. The system controller called the SPC analyzes the calling and called digits and automatically generates time and charge information for the coil call. This information is displayed at the operator's position. The operator then informs the calling subscriber of the requisite charges and listens for distinctive tones generated at the coin station responsive to the deposit of coins thereat. While the operator listens for the tones to determine whether or not the requisite amount has been deposited at the coin station, the system completes the call through the trunk circuit to the toll office and finally to the called station.

In the Shaer system, announcement equipment and coin tone detectors were added to the switching network in the Jaeger-Joel system, in an effort to fully automate the servicing of customer-dialed toll calls from coin pay stations. More specifically, after a digit receiver received the appropriate calling and called information from the local office, and SPC generated ths usual time and charge information. However, instead of supplying this information to an operator, the SPC controlled the network to connect the trunk to an automatic announcement circuit. This circuit then provided the appropriate announcement such as "Please deposit 60 cents". Moreover, the coin stations in the Shaer system were modified as disclosed in E. R. Andregg et al. U.S. Pat. Nos. 3,146,312; 3,170,039; and 3,116,370. Now a number of tone pulses (bursts) were generated for each deposited coin. One pulse was generated for a deposited nickel, two pulses for a dime, and five pulses for a quarter. Coil tone receivers were provided in the Shaer arrangement for detecting these series of pulses to identify the coils deposited in the coil station. To elaborate, first the network was controlled to establish a connection to the announcment circuit and, then after the termination of the announcement, a new connection was established to a coin tone receiver. When the requisite deposit amount was detected, the call was completed without operator intervention.

The Shaer system appears to provide an effective and economical mechanism for automating coin calls. However, a fully automated coil system must be designed to accommodate all idiosyncracies, quirks, pranks and possible mistakes of a large constituency of users having variable levels of user skills. For example, the Shaer system was not adapted to detect coin deposits during annoucements. When a calling subscriber routinely calls the same destination from a coin station, the calling subscriber may well be aware of the requested deposits, and impatiently may make deposits during the annoucements.

It is an object of this invention to provide for the detection of coin tones during announcements, provided either by automatic announcement circuits or by monitoring operators.

It is a further object of this invention to detect coin deposits free from any interference caused by annoucements.

SUMMARY OF THE INVENTION

In accordance with the principles of my invention, voice and other coin deposit signals received from a calling coin station are segregated from the announcements applied to the coin station. Thus, a coin tone detector is able to detect coin deposit tones even during announcements without any interference therewith. Moreover, if operator assistance is required for the call, then the coin tone detector can still detect coin tones even when the operator is speaking to the calling subscriber. This is a valuable attribute because the coin tone detector can assist the operator in distinguishing valid from invalid coin deposit signals.

More specifically, in accordance with one illustrative embodiment of my invention, two hybrid circuits are utilized to isolate signals directed to and received from the calling coil station. The coin tone detector is connected to a path between the hybird circuits over which signals are received from the calling coin stations. Therefore, announcements conveyed to the calling coin station are not received by the coin tone detector.

Even more specifically, a distinct automated coin subsystem with its own controlling computer is added to the TSPS arrangement disclosed in the above-mentioned Jaeger-Joel patent. This distinct computer or microprocessor cooperates with the SPC to control the various announcement circuits and to receive information pertaining to detected coin deposits. The above-mentioned hybird circuits have two terminations on the TSPS network, one connectable to the calling coin station via a TSPS trunk and the other connectable to an operator position. This beneficially allows the operator to utilize the coin detector to detect coins while speaking to the calling party.

In accordance with one feature of my invention, a coin tone detector in an automated coin system is "electrically" segregated from an annoucement circuit and/or operator. This segregation beneficially allows the detector to detect the deposit of coins during announcements as well as to allow the detector to assist the operator in determining the deposited coins while still allowing the operator and customer to converse.

As a subsidiary feature of my invention, prompting announcements can be given after the original announcement without worrying about possible coin detection-announcement interference. For example, if a coin subscriber deposits an amount less than the required amount, an additional prompting announcement can be given indicating the difference due, for example, "Please deposit ten cents more."

BRIEF DESCRIPTION OF THE DRAWING

The foregoing as well as other objects, features and advantages of my invention will be more apparent from a description of the drawing in which:

More specifically FIG. 5 illustrates microprocessor MPO and the manner in which it communicates with its peripheral devices.

FIG. 6 illustrates memory ASTRO which stores binary announcement words and address generator AG which normally controls the addressing of memeory ASTRO.

FIG. 7 illustrates the ac transmission of serial announcement words to the announcement circuits;

FIG. 8 illustrates the circuitry in the announcement circuits;

FIG. 9 illustrates the manner in which address information is serially conveyed to the coin tone detectors to selectively interrogate these detectors;

FIG. 10 illustrates the circuitry in the coin tone detectors;

FIG. 11 illustrates the manner in which FIGS. 5-10 are to be arranged;

FIG. 14 illustrates the manner in which FIGS. 3 and 4 are to be combined;

FIG. 15 shows in a flowcart form the manner in which automated coin subsystem ACS in FIG. 1 operates to handle coin telephone calls;

FIGS. 16-23 illustrates how the TSPS in FIG. 1 functions to handle coin serviced without operator assistance;

FIGS. 24-37 illustrate how TSPS operates to handle coin calls requiring operator assistance.

GENERAL DESCRIPTION

Figure 1:
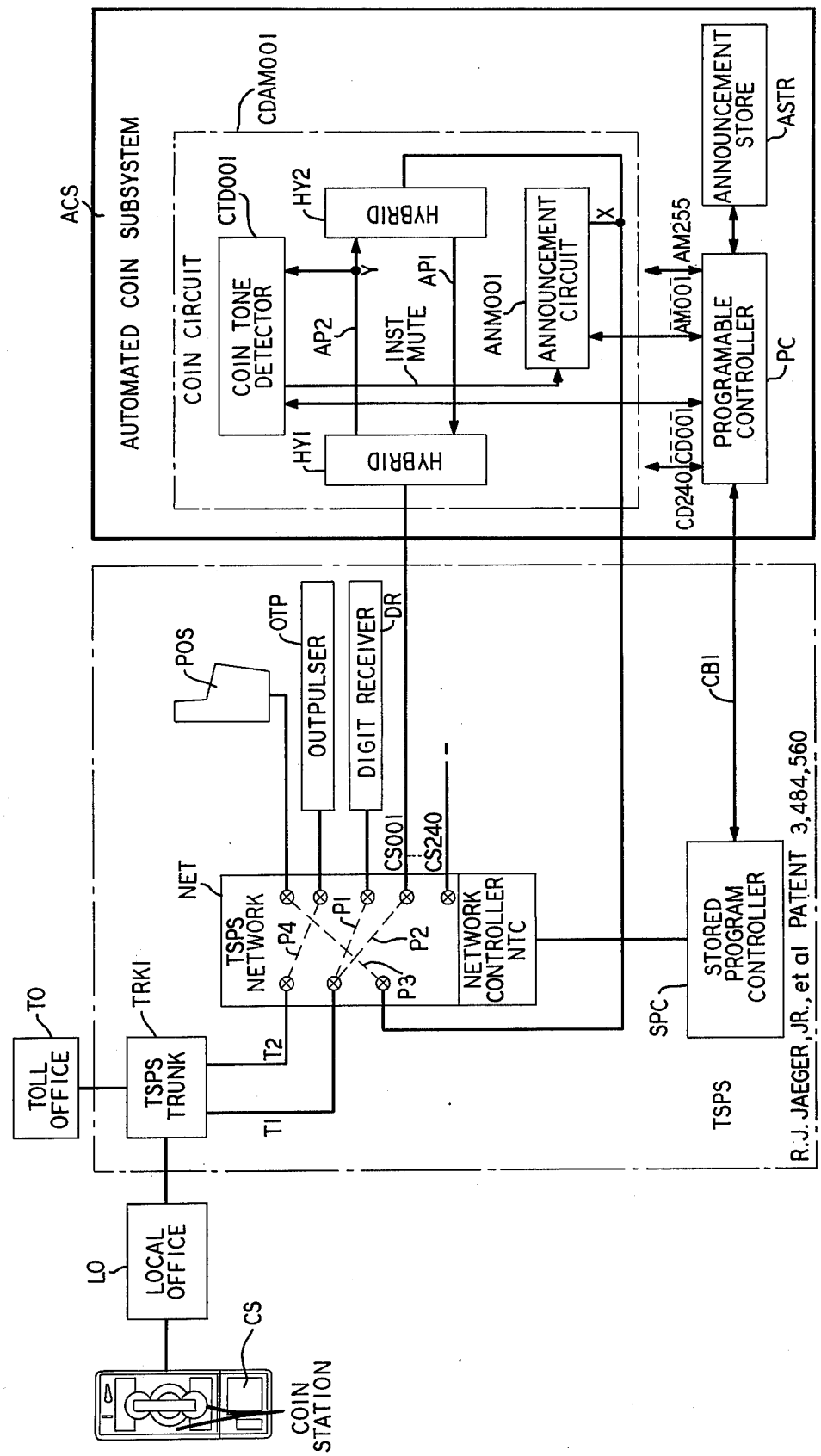
FIG. 1 illustrates in block diagram form the manner in which an automated coin subsystem, operable in accordance with the principles of my invention, is added to an existing Traffic Service Position System (TSPS)

FIG. 1 illustrates in block diagram form the manner in which an automated coin subsystem ACS is added to an existing TSPS office to automate calls from coin stations in accordance with the principles of my invention. The TSPS is comprehensively described in R. J. Jaeger, Jr. et al U.S. Pat. No. 3,484,560, issued Dec. 16, 1966, and also in the December 1970 issue of the *Bell System Technical Journal*. Prior Art TSPS System With the advent of TSPS, many of the functions previously performed by an operator at a cordboard were automated. More specifically, a customer at a coin station CS would make an initial deposit and then dial a 1 followed by 7 to 10 digits. The local office LO routes the call to a TSPS trunk TRK1 and down conductors T1 to the TSPS network NET. Stored program controller SPC which is a duplicated processing unit for performing arithmetical and logical functions on data in according with its stored program, controls network controller NTC to establish connection P1. The local office transmits the calling and called digits to digit receiver DR via conductor T1 in the normal menner. The tsps rates the call and displays the charge and initial period to an operator at a position such as position POS. A new network connection to then established between conductors T1 and position POS by TSPS network NET. While the operator at position POS informs the calling party of the requisite coin deposit, outpulser OTP is controlled by the SPC to outpulse the digits in the called number via path P14 and conductors T2 to toll office TO. When the calling subscriber deposits coins at station CS, distinctive tones are generated thereat indicating the type of coin deposit, i.e., nickel, dime, quarter. While the customer is depositing the coins, the toll office TO establishes the call to the called station in the normal manner. When the called party answers and the operator has determined what the requisite amount has been deposited, the call is cut through under the control of the operator by trunk TRK1 directly from the local office LO to the toll office TO.

At the end of the initial period, TSPS trunk TRK1 is connected via conductors T1 back to an operator's position POS (or any other idle position). The operator then informs both parties that the initial period has ended and to signal at the end of the call. The operator's position is then released and the call is again directed routed via trunk TRK1. If the subscribers do not go on-hook after the last announcement, then the call continues. The operator is again reconnected to the calling station via conductors T1 at the end of the call and requests additional overtime changes and then listens for the deposit of additional coins at coin station CS. If a long period of time elapses, the operator may be reconnected to collect further deposits before allowing the call to continue.

AUTOMATED COIN SUBSYSTEM

Automated coin subsystem ACS in FIG. 1 is operable to perform all operator functions previously described on coin paid station-to-station toll calls. In ACS, announcements to the customer are provided by announcement circuits such as ANM001 and coil deposits are automatically detected by coin tone detectors such as CTD001. To elaborate ACS includes up to 240 coin circuits CDAM001-CDAM240. FIG. 1 only illustrates one coin circuit CDAM001; however, it should be understood that numerous others of these coil circuits are provided in accordance with normal traffic engineering principles, as hereinafter described.

The following will describe how ACS handles a typical coin paid toll call. The customer at coin station CS makes an initial deposit and then dials the call in the same manner previously described. Local offices LO routes the call to TSPS and outpulses the calling and called digits which are received at the TSPS in digit receiver DR via path P1 from the T1 conductors. The SPC rates the call and instead of selecting an idle operator position, it selects an idle coin circuit CDAM001, for example. The SPC controls controller NTC to establish connection P2 from the T1 conductors to leads CS001. SPC then sends a command including the identity of the chosen coin circuit, the call charge and the initial period to programmable controller PC via cable CB1. Controller PC comprises self-checked, duplicated microprocessor, as hereinafter described. Responsive to this information from the SPC, programmable controller PC accesses the appropriate memory locations in announcement store ASTR and applies the digital binary bit information representing digitized speech retrieved from store ASTR in serial to announcement circuit ANM001 via lead AM001. Circuit ANM001, as hereinafter explained, includes a digital-to-analog converter for converting the serial binary information into audible speech. The announcement requesting the appropriate deposit and intial time period (e.g., "Please deposit 60 cents for the first three minutes") is applied to the calling subscriber via point X, hybrid HY2, path AP1, hybrid HY1, leads CS001, path P2, conductors T1, and local office LO to station CS.

Responsive to the received announcements, the calling subscriber begins to deposit coins in station CS. Station CS generates dual frequency, in-band tones for each coin deposited and indicates the amount of the deposited coin by generating a sequence of one or more tone pulses; for example, a single-dual frequency pulse is generated for each nickel deposited, while two such pulses are generated for each dime deposited, and five such pulses are generated for each quarter deposited. These tones are received over conductors T1, network connection P2, leads CS001, hybrid HY1, and path AP2 by coin tone detector CTD001. This detector comprises means for detecting the joint presence of the two distinct frequencies and for counting the number of pulses thereby indicating the amount of each coin deposit in five-cent increments. Coin tone detector CTD001 is periodically scanned by programmable controller PC over lead CD001 and receives any coin deposit detection information therefrom. For each coin deposited, programmable controller PC updates its temporary memory for that detector and determines the requested deposit has been made and if not, waits for additional coins to be deposited. As explained hereinafter, if the coins deposited are not sufficient, then the programmable controller PC accesses store ASTR and applies another announcement message or a prompt (e.g., "Please deposit 30 cents more") to the calling subscriber via announcement circuit ANM001.

In accordance with one illustrative embodiment of my invention, coin tone detector CTD001 and announcement circuit ANM001 are segregated through the use of two hybird transformers HY1 and HY2 and paths AP1 and AP2. This segregation beneficially allows the detection of coin deposits during announcements and, at the same time, prevents the announcement circuits from inadvertently tripping the coin tone detectors. Moreover, if the calling subscriber does not properly respond to the recorded announcements, then an operator is connected to the call via the TSPS trunk side termination of hybrid HY2, and detector CTD001 assists the operator in detecting valid coin deposits. For example, connection P3 is established form hybrid HY2 to position POS. The operator can then speak to the calling station without inadvertently tripping the coin tone detector CTD001 because the operator's voice is applied to the calling station via path AP1 (and not AP2). Moreover, coin tone detector CTD001 is still connected to the call and can help the operator detect the deposit of coins. In contrast, detector CTD001 is believed to be more accurate in detecting valid coin deposit tones than is the operator. Sometimes the operator can be fooled into thinking that coins have been deposited by the subscriber hitting combinations of selected multifrequency signalling tones. Detector CTD001 is sensitive to the actual frequencies of the received tones.

Thus, in accordance with one aspect of my invention, hybrid circuits segregate the coin tone detector from the announcement circuit and operator, beneficially allowing the detection of tones during announcements or operation speech while avoiding the problem of such announcements for speech accidentally tripping detector CTD001.

Normally operator intervention will not be required on coin deposit station-to-station toll calls. When programmable controller PC determines that the proper deposit has been made, it reports this to the SPC via cable CB1. The ACS is then disconnected from the call. The SPC then controls outpulser OTP to outpulse the called number via network connections P4 and conductors T2 to toll office TO. When the called station goes off-hook, TSPS releases and the call is cut directly through TSPS trunk TRK1.

At the end of the initial period, network connection P2 is established from conductors T1 of trunk TRK1 to coil circuit CDAM001 and the SPC commands ACS to make a notify announcement. The appropriate storage locations are accessed in memory ASTR and an announcement (e.g., "Three minutes has ended. Please signal when through.") is applied to the calling subscriber by announcement circuit ANM001 via the two hybrids, path AP1 and network connection P2. After ACS makes the announcememt, TSPS disconnects the coin circuit from the call and the subscriber conversation continues.

If the call continues beyond the initial period, a coin circuit such as CDAM001 is connected at the end of the call to conductors T1 under control of the SPC. Coin circuit CDAM001 is controlled by controller PC under instructions from the SPC to request the overtime charges (e.g., "Please deposit one dollar and sixty cents for the past 20 minutes") and detector CTD001 monitors the coin deposits. When the required deposit is detected, the SPC is again notified and operates to disconnect ACS from the call.

ACS is also utilized to provide notification on other coin and noncoin calls and also provides time and charges quotations on calls other than coin paid calls.

SAMPLE STATION-TO-STATION COIN PAID CALL

With ACS a coin customer places a station-to-station toll call by dialing a 1 plus the called number. (The 1 is not required in all areas.) This call is routed to TSPS by the local office. After TSPS receives the calling number, called number and automatic number identification ANI digits, TSPS performs coin rating on the call, the TSPS establishes connection P2 to bring the call to coin circuit CDAM001 and the SPC passes the initial period and charge information to ACS. The call is not outpulsed forward, until ACS completes the initial contact with the calling customer. Using the rating information, controller PC accesses store ASTR to sequentially construct an announcement that requests the customer to make the necessary deposit. A tone is generated to gain the customer's attention and then the following announcement is generated for the customer: "Please deposit X dollars and Y cents for the first Z minutes." Some customers need the amount to be repeated before they begin depositing. Therefore, if no deposit is detected within six seconds after the initial announcement, ACS prompts a customer by saying: "Please deposit X dollars and Y cents."

Some customers begin depositing but stop before the requested amount is deposited. For example, some customers lose count of the coins deposited. To accommodate these customers, if the time between coin deposits exceeds 6 seconds and the deposit request is not satisfied ACS prompts the customer by saying: "Please deposit X dollars and Y cents more."

When the customer deposits the correct amount. ACS informs TSPS to outpulse the call and then generates a "Thank you" announcement to acknowledge receipt of the deposit. If the customer deposits too much money for the call, then controller PC recognizes this and applies the following announcement to the customer: "Thank you, you have W cents credit toward overtime."

ACS also monitors coin deposits during announcements. If a coin is detected during the announcement, the announcement is truncated immediately. For example, when coin tone detector CTD001 detects the beginning of a sequence of coin deposit tones, it applies a signal on lead INST MUTE in FIG. 1, which signal controls announcement circuit ANM001 to immediately terminate the announcement.

Some coin customers may not properly respond to fully automated service; therefore operator's assistance is still needed. For example, customers who lack the correct change may request that the changes be billed to a credit card, to a third party, or to the called party. These calls are normally dialed with a 0 prefix. However, if the customer does not dial the 0, the call will still reach an operator since the ACS a call "times out" if no deposit is detected within 6 seconds after the last prompt. In addition, if a customer flashes during the ACS deposit announcement, the call is immediately connected to an operator. TSPS responsive to the flash informs the ACS to suspend coin deposit announcements and timing of this call. Such sequences are diagramatically illustrated on the flowchart in FIG. 15.

ACS also generates the notification of the end of the initial period on all coin paid calls whether the initial deposit was handled by ACS or by an operator. When TSPS diming determines that the initial charge period has ended, the call is automatically connected to the coin circuit. TSPS then informs ACS of the length of the initial period and ACS provides the following announcement: "Z minutes have ended. Please signal when done." ACS informs TSPS when the announcement is completed and TSPS disconnects ACS and starts overtime timing.

When a call goes into overtime, TSPS permits the call to lapse a certain number of overtime intervals before bridging ACS onto trunk TRK1 to request an intermediate deposit.

At the end of the call, ACS also handles the final charge due announcement. The intermediate deposits and the end of call announcements are the same and indicate: "Please deposit X dollars and Y cents for the past Z minutes." These announcements will also be followed by prompts if deposits are not forthcoming. A time-out and subsequent operator connection may also occur during this portion of the call.

TIME AND CHARGE QUOTATIONS

When a customer requests that time and charges be quoted on a call, the operator instructs the customer to flash and remain off-hook at the end of the call. At the end of the call, TSPS informs ACS of the charges and the length of the conversation. ACS generates the following announcement: "Charges are X dollars and Y cents plus tax for Z minutes." This type of service can be given to noncoin customers or coin customers making other than paid calls.

CUSTOMER REQUESTED NOTIFICATION

A customer (making a call other than a sent paid and who has dialed 0 plus the called number) can ask an operator to notify him at the end of any period between 1 and 10 minutes. The operator enters this information by depressing the appropriate keys at the TSPS operator position POS. For such calls, TSPS connects ACS to the call at the end of the indicated time. TSPS informs ACS of the number of elapsed minutes and ACS generates the following announcement: "Z minutes have ended." When the ACS informs the TSPS that the announcement has been completed, TSPS disconnects ACS and continues to time the call.

PREPAY COIN STATIONS

Prepay coint stations provide dial tone without the deposit of an initial coin. Responsive to this dial tone, the subscriber dials the entire number in the normal manner. The serving telephone office analyzes the dialed number and ascertains whether it is a "free" call (e.g., 800 number), a local call or a toll call. Toll calls will be connected to the TSPS in the manner previously described and the normal messages given as to the required deposit. If the subscriber is aware of the required deposit, he or she may begin the depositing of coins after dialing the called station number. In this situation, ACS, responsive to the detection of the coins, will dispense with all announcements if the proper amount is deposited within the allowed time interval.

SUMMARY OF TSPS-ACTS INTERACTIONS FOR VARIOUS CALL TYPES

FIGS. 16—37 illustrate in flowchart form TSPS operational procedures for various types of calls served by ACS both with and without operator assistance. These flowcharts are largely self-explanatory and describe in greater detail the previously discussed TSPS-ACS interactions.

To elaborate, 0- calls are those operator assistance calls in which the subscriber only dials a 0. 0+ calls are operator assistance calls in which the subscriber dials a 0 followed by a complete sequence of digits. In 1+ calls the subscriber dials a 1 followed by the called number. These calls are station-to-station coin calls which do not normally require operator assistance. The flowcharts on FIGS. 24–37 which pertain to operator assisted calls include indications of particular TSPS console keys (such as collect, busy, position release, start key, etc.) which are depressed by the operator.

FUNCTIONAL FLOWCHART OF ACTS

FIGS. 38–41 indicate, in the form of flowcharts, how ACS functions to handle various types of calling situations, most of which have been described above. These situations include (1) station paid coin call-initial seizure, (2) end of initial period for any coin paid call, (3) time and charge quote, (4) time notification for non-coin customer, and (5) charges due on any paid coin call.

ANNOUNCEMENT GENERATION

As described more fully hereinafter, announcement store ASTR in FIG. 1 stores binary announcement information utilized to generate 512 ms speech intervals or segments. For convenience these intervals will sometimes be called one half-second intervals. Customer announcements are generated by selectively combining various one half-second phrases. For example, the following are some of the one half-second phrases in the machine's vocubulary: one, two, three, four,...ten, twelve, twenty, -one, -two, -three, -four, thirty. dollar, dollars, cent, cents, for the first, minute, minutes, credit, more, and the hyphenated words are concatenated with other numbers (e.g., twenty-one).

Other longer words are generated by combining one or more half-second phrases. For example, the following words are generated by combining two half-second phrases: eleven, thirteen, fourteen, fifteen, sixteen, thank you, please deposit, etc. Additionally, certain other phrases are generated by combining three half-second phrases such as: has ended, plus tax for, for this call, the charges are, toward overtime, etc.

As explained hereinafter more fully, each of the half-second phrases is stored in 400 consecutively addressed memory locations, each including a 40-bit data word. Thus each half-second phrase is encoded in 16,000 binary bits. These bits are retrieved one word at a time and applied in serial to the appropriate announcement circuit. Each circuit converts the digital bit stream into an analog speech signal. The previously described announcements are generated by combining the appropriate phrases in sequence. Thus all the announcements can be generated from basically the same group of vocabulary words.

ARCHITECTURAL OVERVIEW OF ACS

Figure 2:
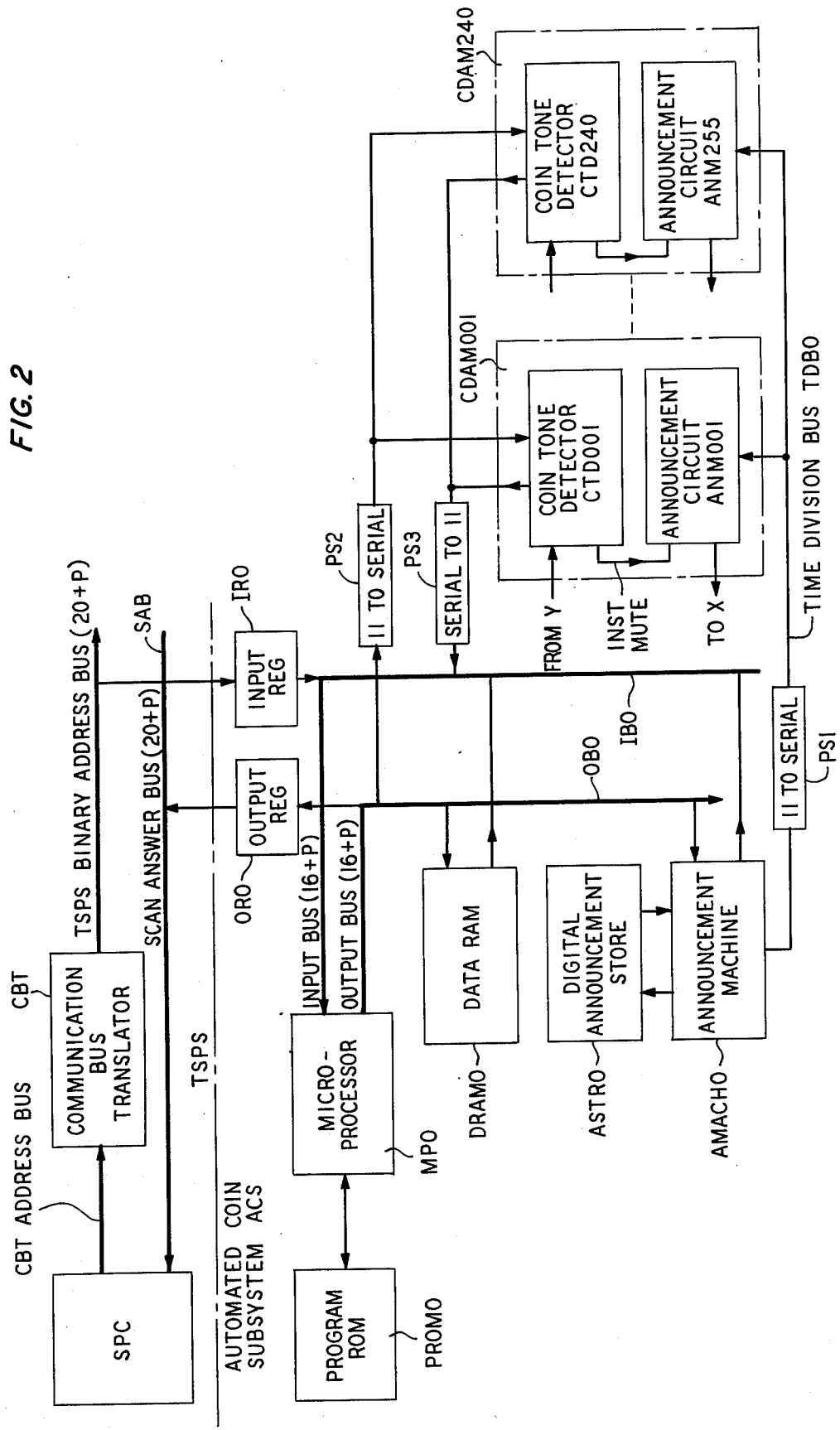
FIG. 2 illustrates in greater detail the interface between the stored program controller in TSPS and the microprocessing complex broadly shown as programmable controller PC in FIG. 2.

FIG. 2 illustrates in block diagram form the major components in ACS as well as the specific manner in which ACS communicates with the SPC.

After the SPC establishes a network connection to one of the coin circuits CDAM-, it has to inform ACS of the specific announcement and/or collection action required. As mentioned previously, these commands, for example, start an initial collection sequence, give notification or start an overtime collection sequence.

To elaborate, the SPC operates in accordance with the flowchart of TSPS operations previously mentioned in regard to FIGS. 16–37. More specifically the SPC applies a 20-bit command to the CBT address bus. This command is received by communications bus translator CBT which partially decodes the information and transmits it over an ac bus called the TSPS binary address bus. This bus is 21 bits wide including 20 data bits and a parity bit (P) over the data bits. As illustrated on page 2563 of the December 1970 issue of the *Bell System Technical Journal*, the CBT communicates with numerous peripheral devices over the TSPS binary address bus. ACS is added to the existing peripherals. Enable information transmitted from the SPC is decoded by a central pulse distributor (not shown) which selects the particular peripheral unit, such as ACS, which should receive the particular order on the TSPS binary address bus. Thus, the central pulse distributor enables 42 bit input register IRO (actually three smaller registers) to receive the 21 bits of information from the TSPS binary address bus. Since commands to the ACS sometimes require 40 bits plus 2 parity bits, two 21-bit data words are sequentially loaded into input register IRO.

ACS is controlled by microprocessor MPO. In this one illustrative embodiment of my invention, microprocessor MPO is a 16-bit parallel machine with a 1 $\mu$s cycle time. The data manipulation units (not shown) in microprocessor MPO are duplicated and numerous self checks are made between the outputs of the data manipulation units to ensure the effective operability of microprocessor MPO. Program memory PROMO is a read only memory with stores 24-bit wide program instructions encoded to implement the ACS flowchart previously mentioned in regard to FIGS. 38–41. The 24-bit program words include 6 bits of error checking information and 18 bits of actual program instructions. One suitable microprocessor is described in R. W. Sevcik U.S. Pat. No. 3,931,505, issued Jan. 6, 1976. Of course, other suitable 16-bit microprocessors are also commercially available.

Microprocessor MPO communicates with its peripheral devices over distinct input and output buses IBO an OBO respectively. These are each dc buses for transmitting 16 information bits and a parity bit over the information bits. The tone detector CTD001 and announcement circuit ANM001 in coin circuit CDAM001, previously described in regard to FIG. 1, are also illustrated in FIG. 2. In addition, coin circuit CDAM240 is also illustrated. Each coin circuit includes a tone detector and an announcement circuit. The detectors are designated CTD001 through CTD240. The announcement circuits are designated ANM001 through ANM255. Although there are 240 announcement circuits, as described hereinafter, the announcement circuits are designated partially corresponding to the time slots in which such circuits are serviced. There are 256 time slots, but not all of these are used to service announcement circuits. Thus the 240th announcement circuit is actually designated ANM255.

Data random access memory DRAMO is utilized to store transient call data pertaining to the coin circuits. A block of 16 words in DRAMO is assigned to each coin circuit. Each of the DRAMO words is 16 bits wide plus a parity bit. Reading or writing DRAMO is a two-cycle operation; first microprocessor MPO applies a 16-bit address plus parity on output bus OBO. During the next cycle, the word stored at the memory location indentified by the address is output onto input bus IBO if a road command is specified. For a write command, the data on output bus OBO is input into DRAM and stored therein at the memory location identified by the address.

Announcement machine AMACHO controls the accessing of digital announcement store ASTRO responsive to data received from microprocessor MPO. ASTRO stores each 512 ms phrase in 400 consecutively addressed 40-bit data words.

Figure 12:
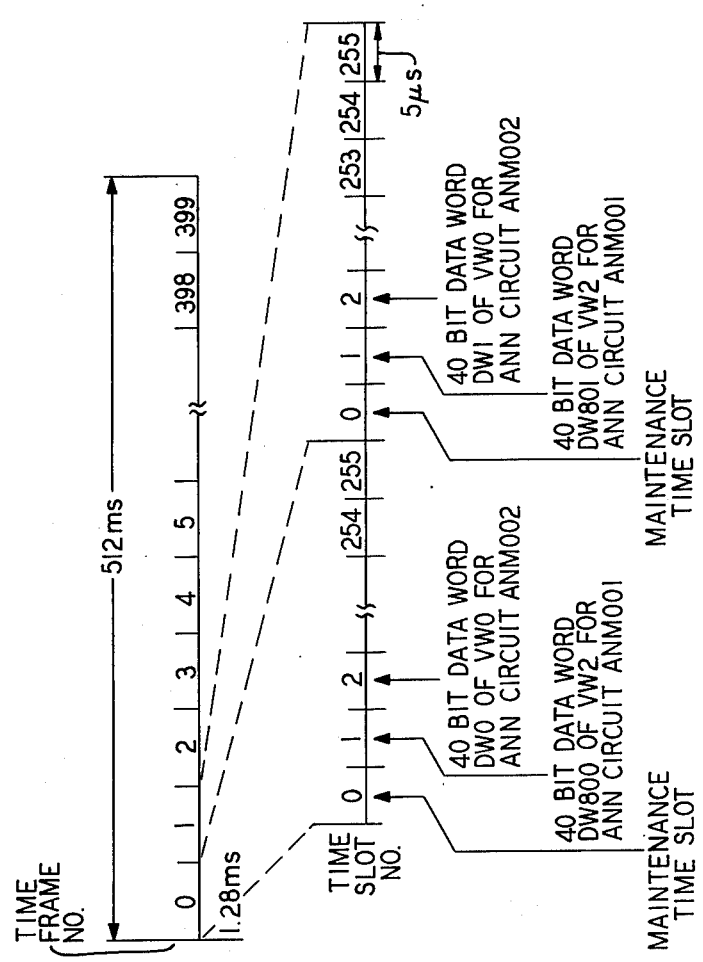
FIG. 12 illustrates how "real-time" is divided into time frames and time slots. Each announcement circuit is serviced during an assigned time slot.
Figure 17:
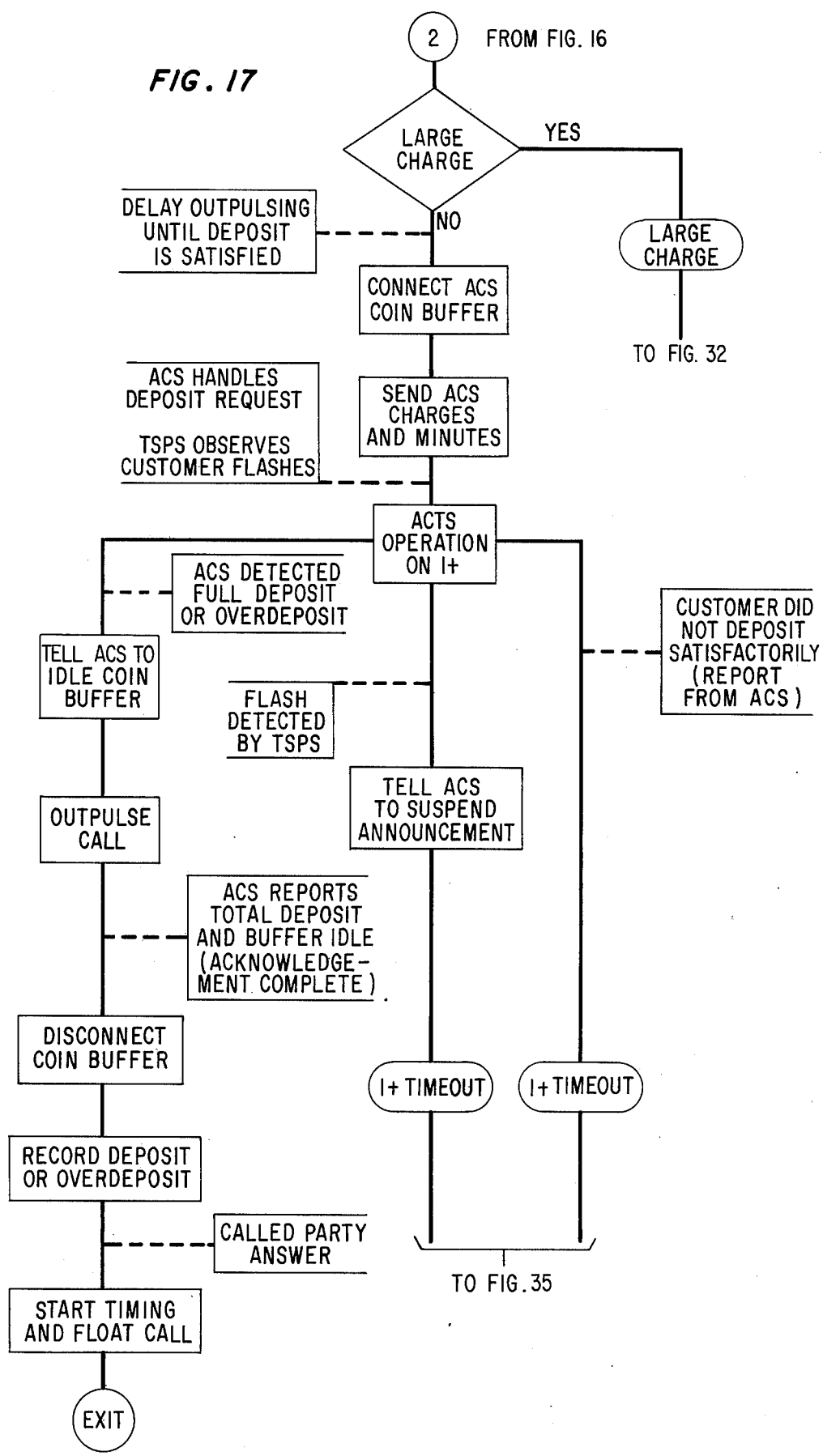
Figure 18:
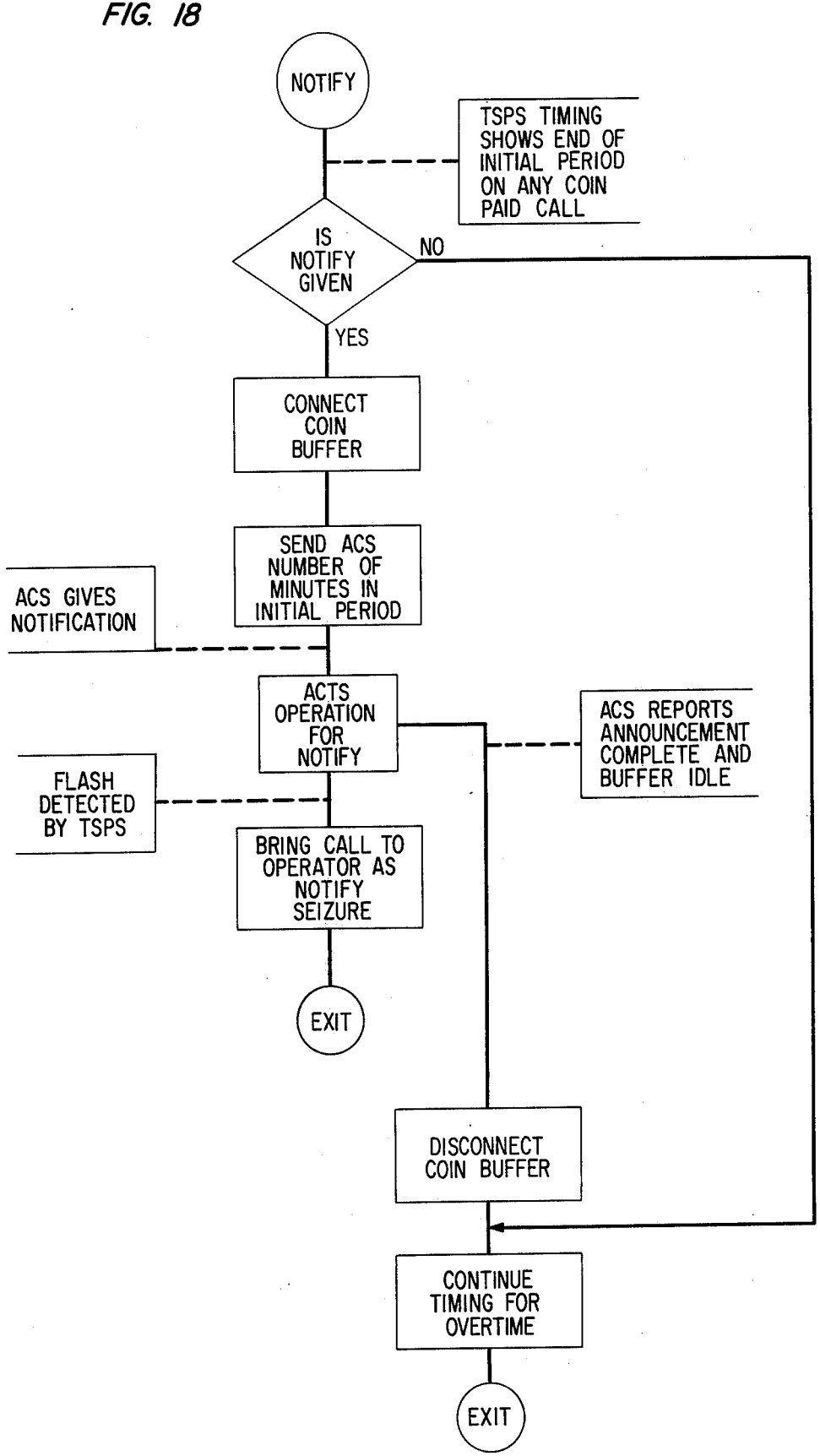
Figure 19:
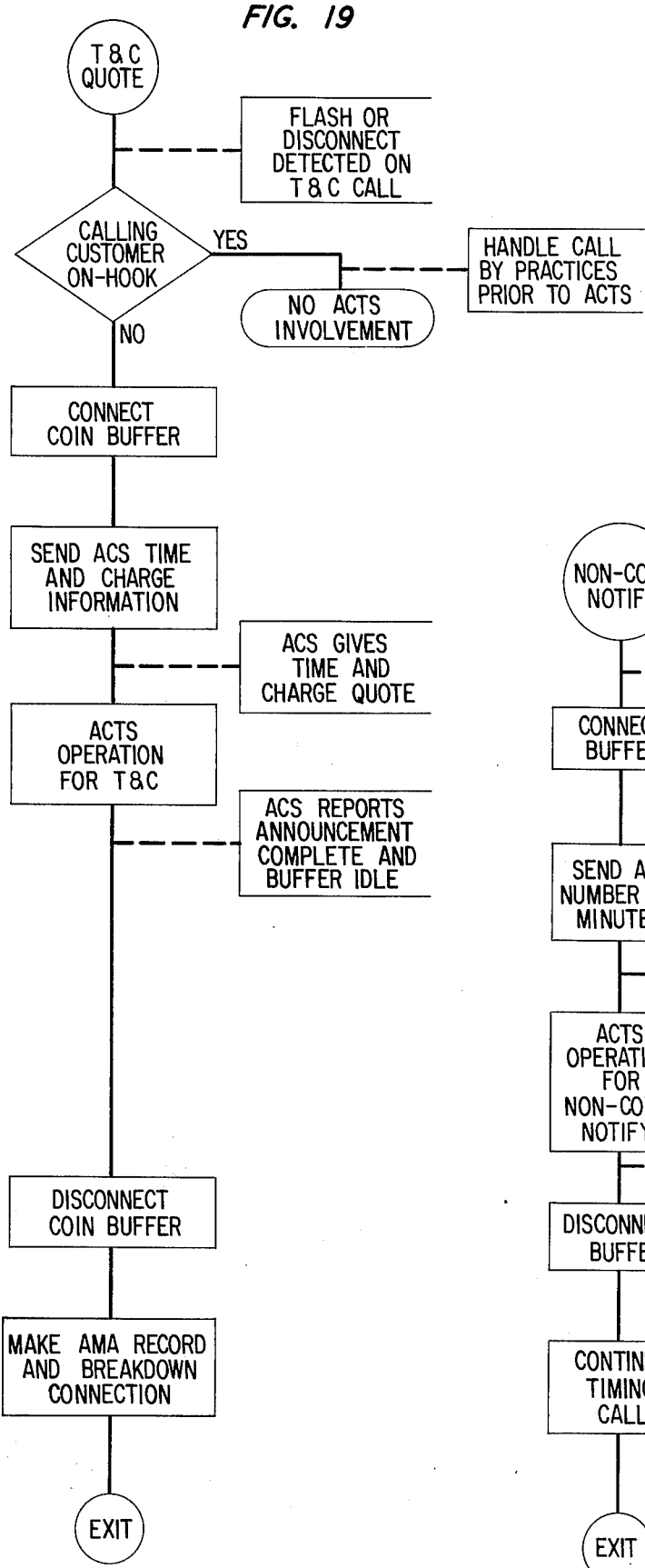
Figure 20:
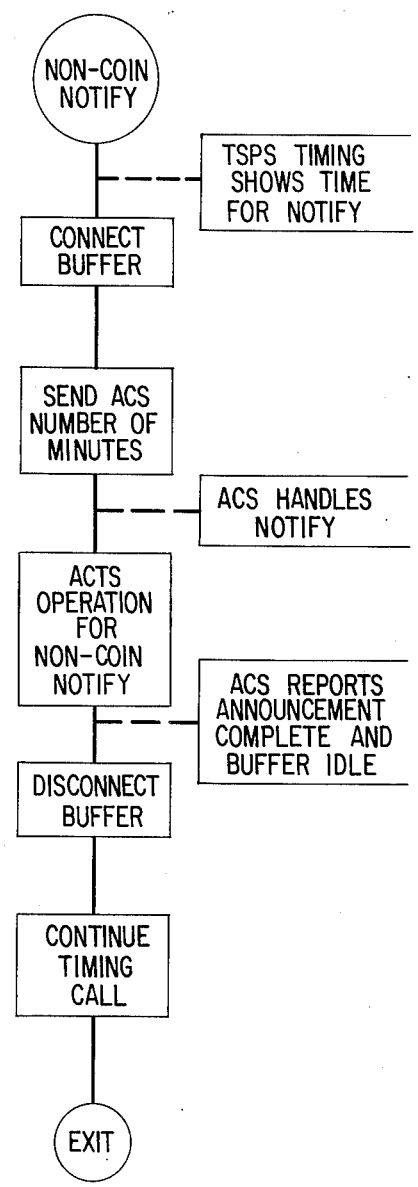
Figure 21:
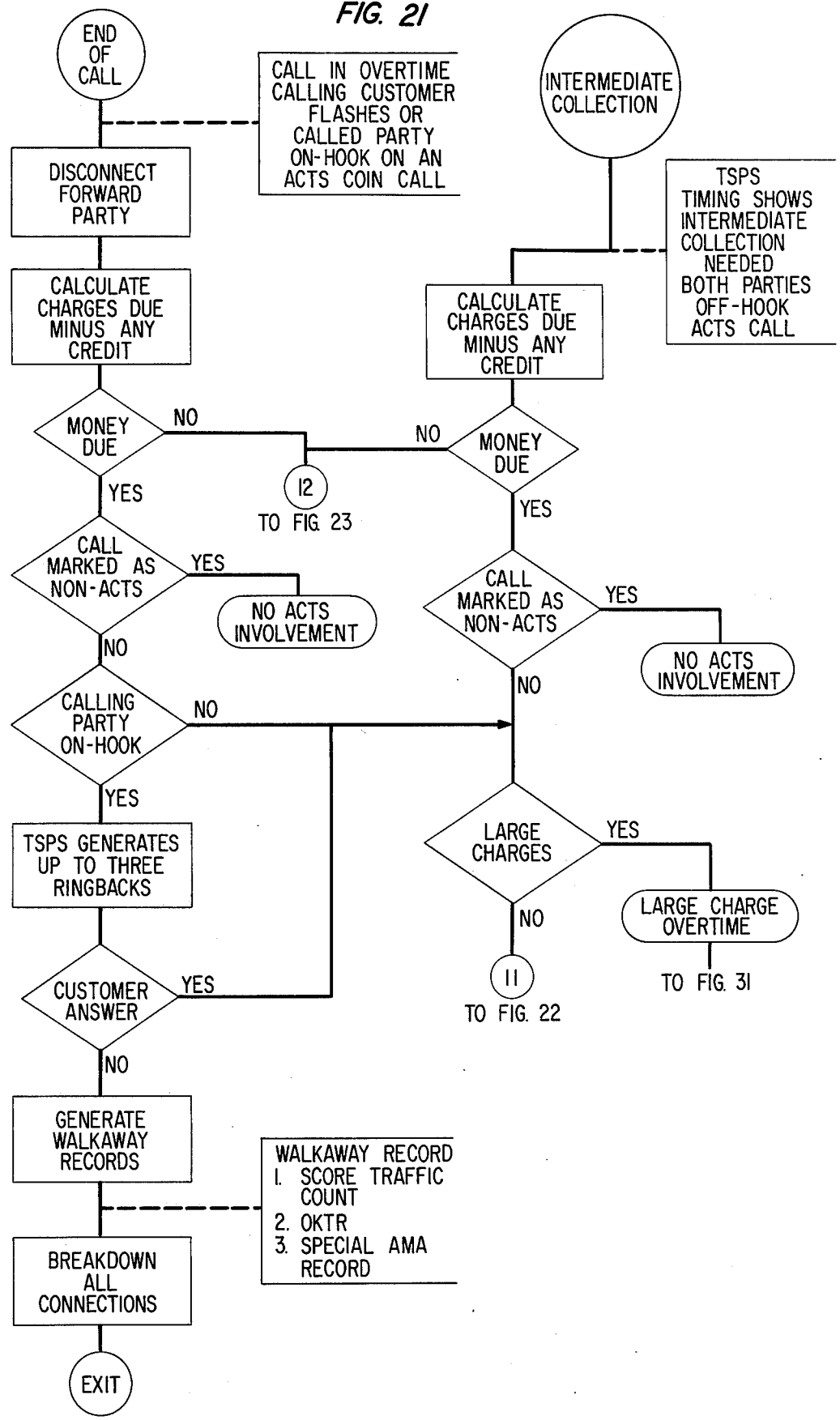
Figure 22:
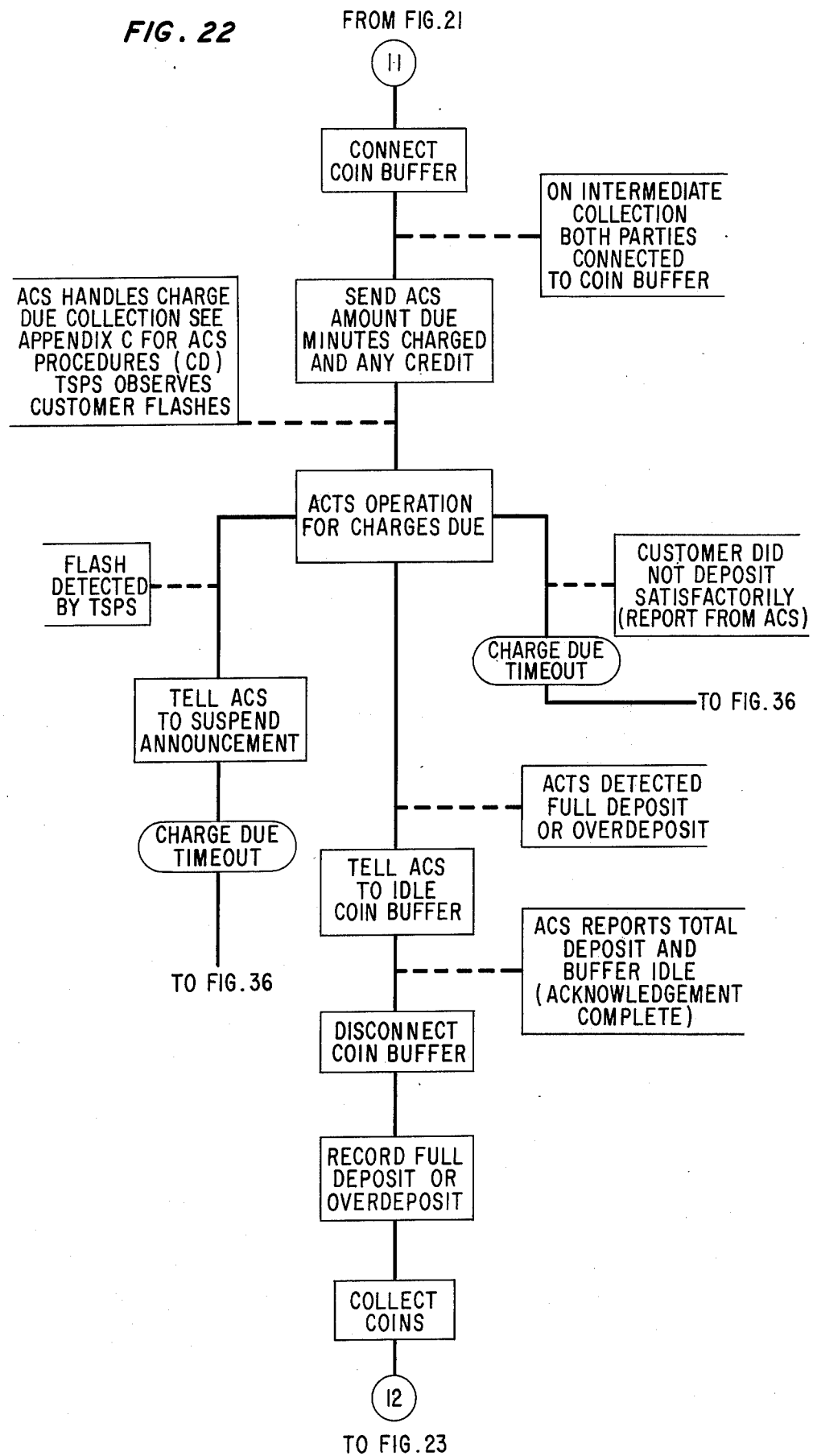
Figure 23:
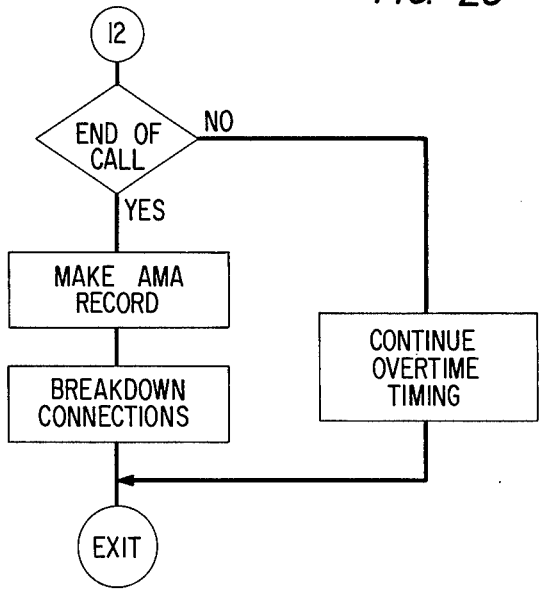
Figure 24:
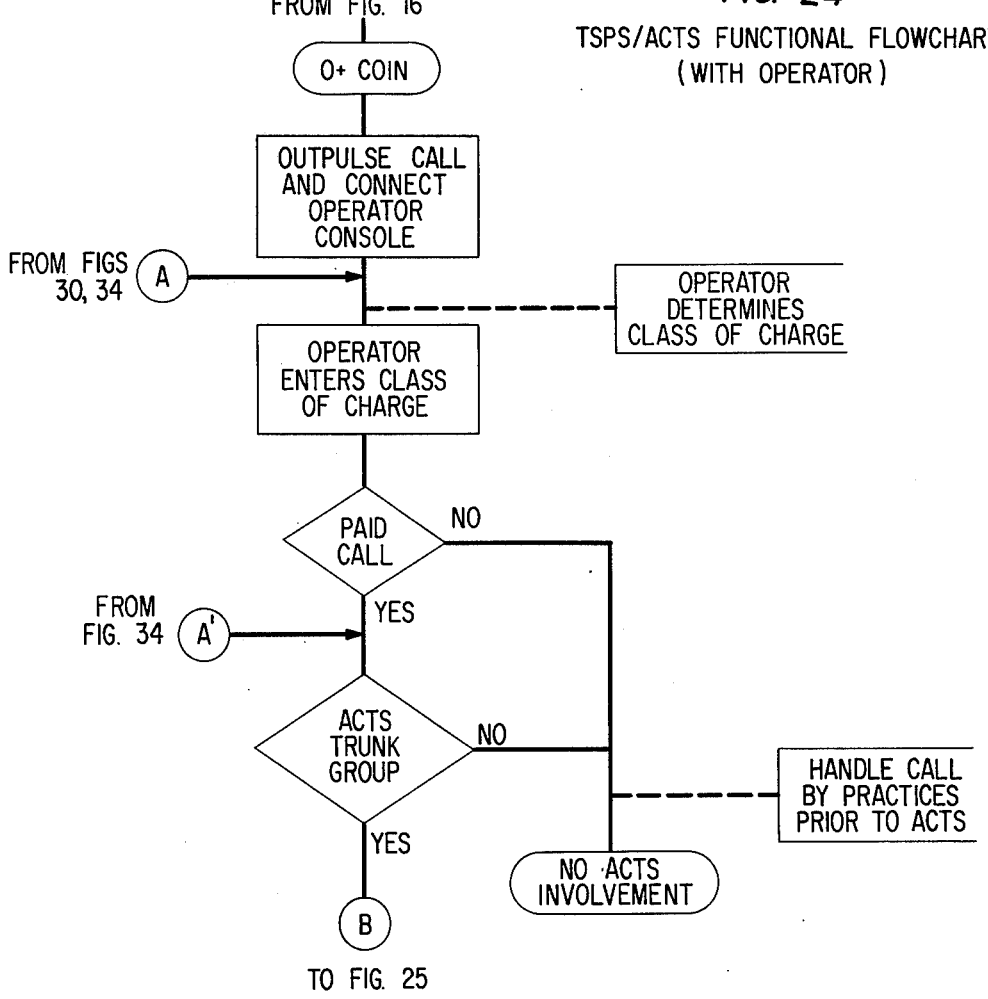
Figure 25:
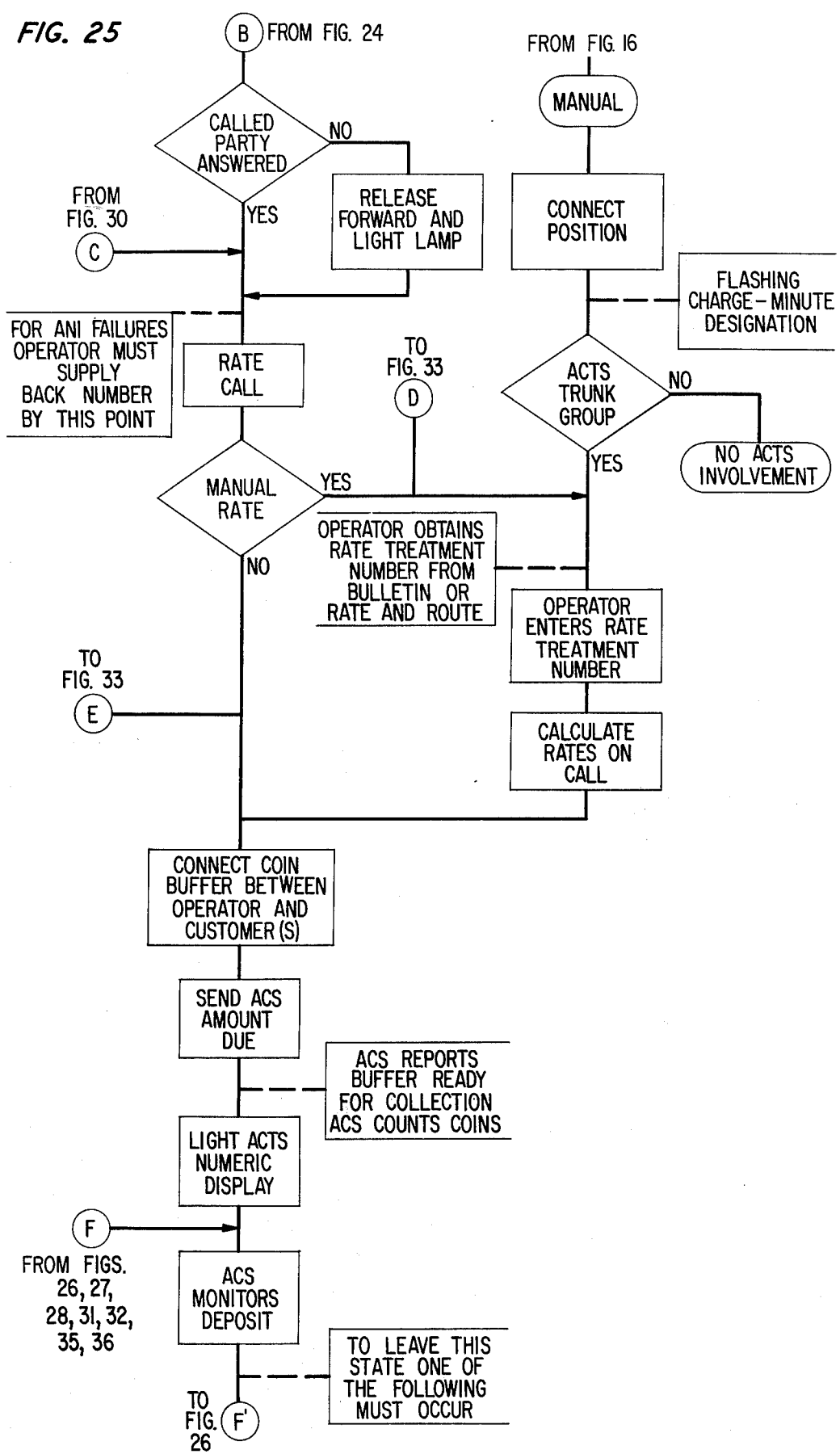
Figure 26:
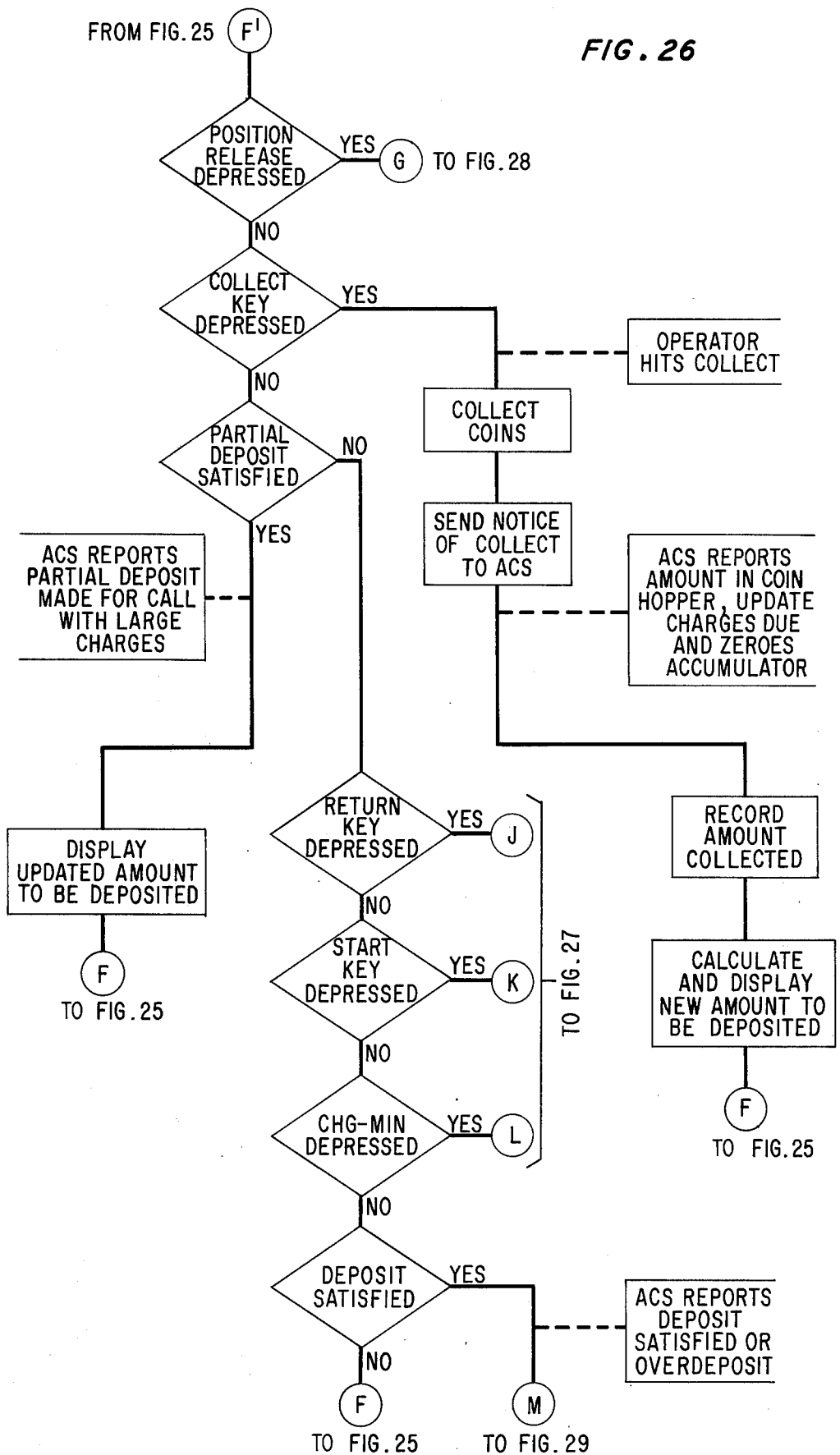
Figure 35:
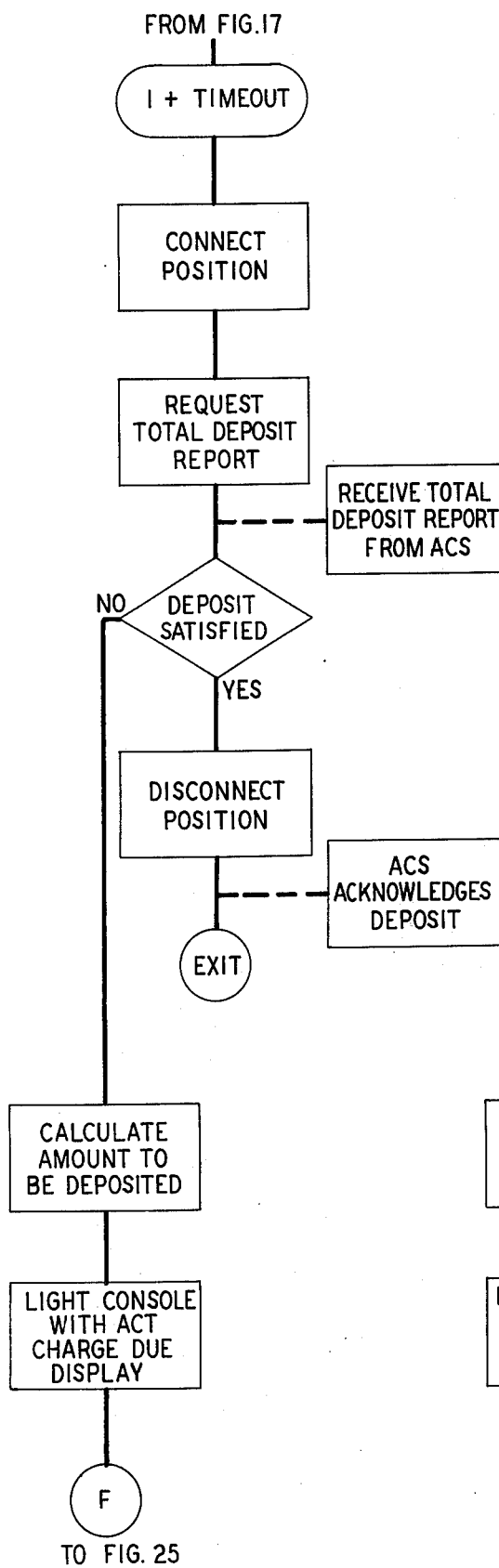
Figure 36:
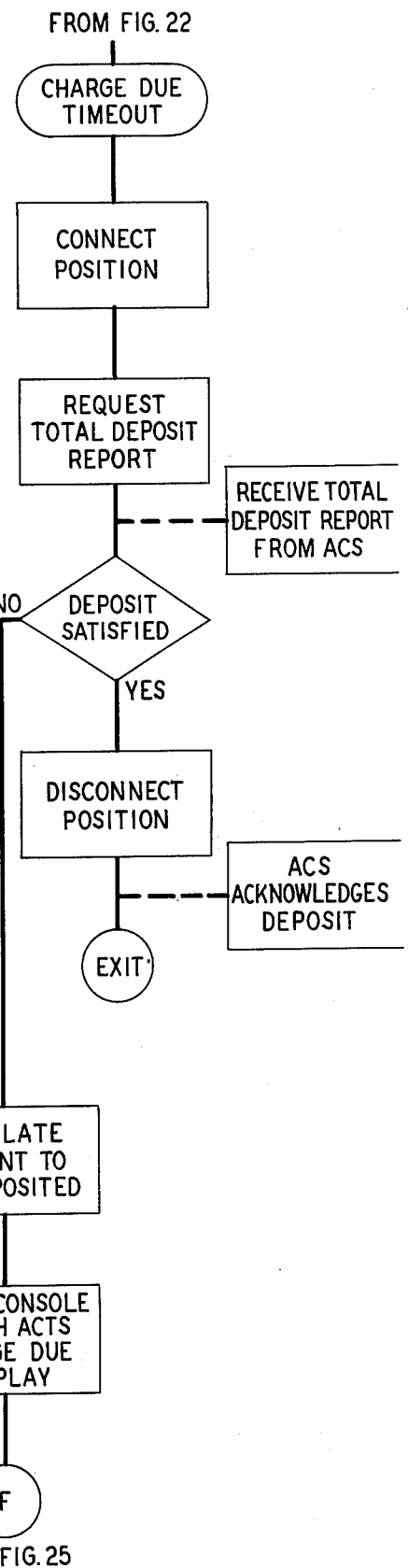
Figure 37:
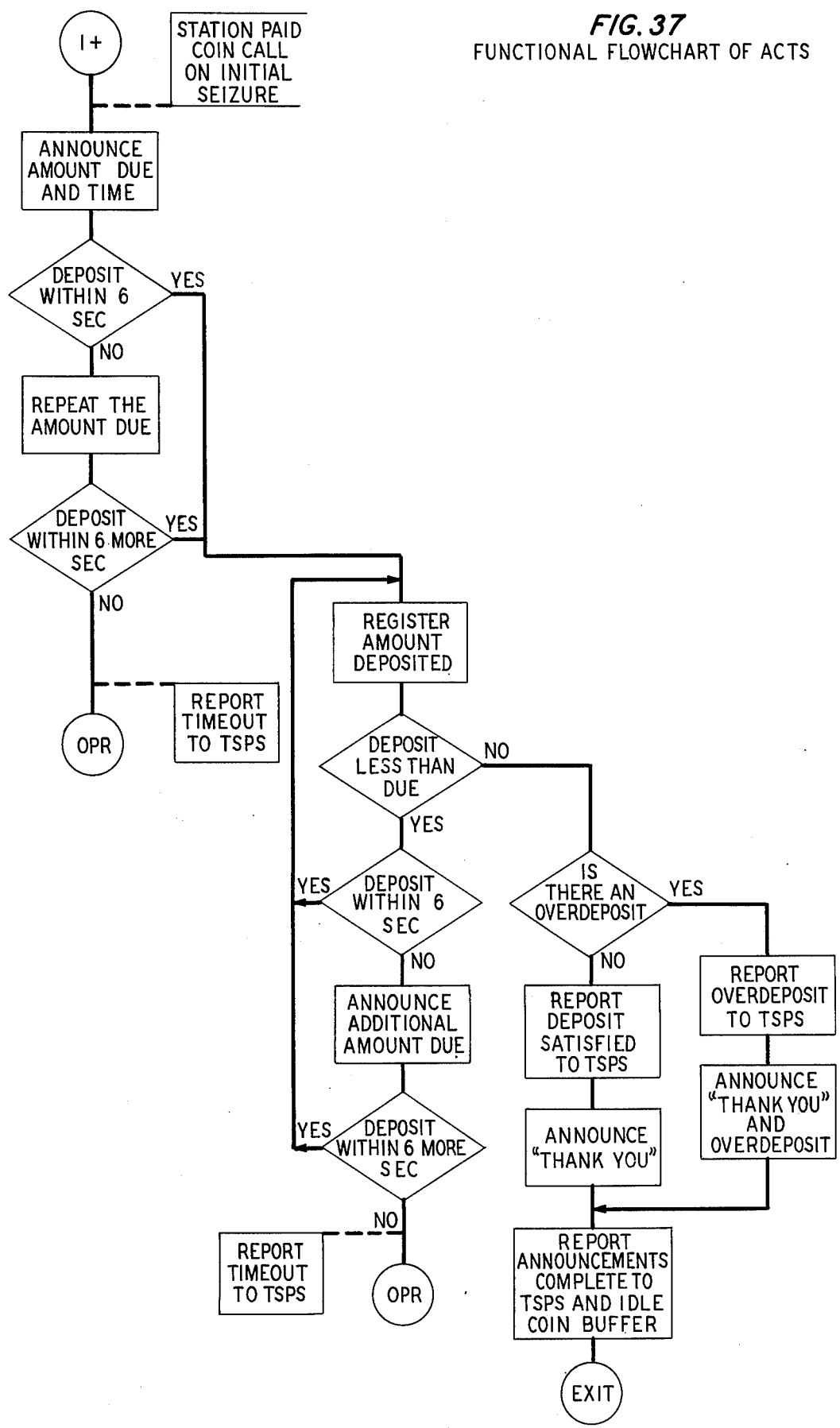
Figure 40:
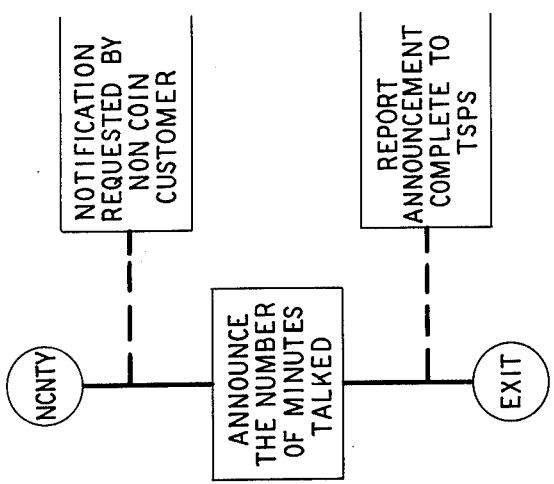
FIGS. 38-41 illustrate the manner in which the automated coin subsystem in FIG. 1 operates to handle coin calls.
Figure 39:
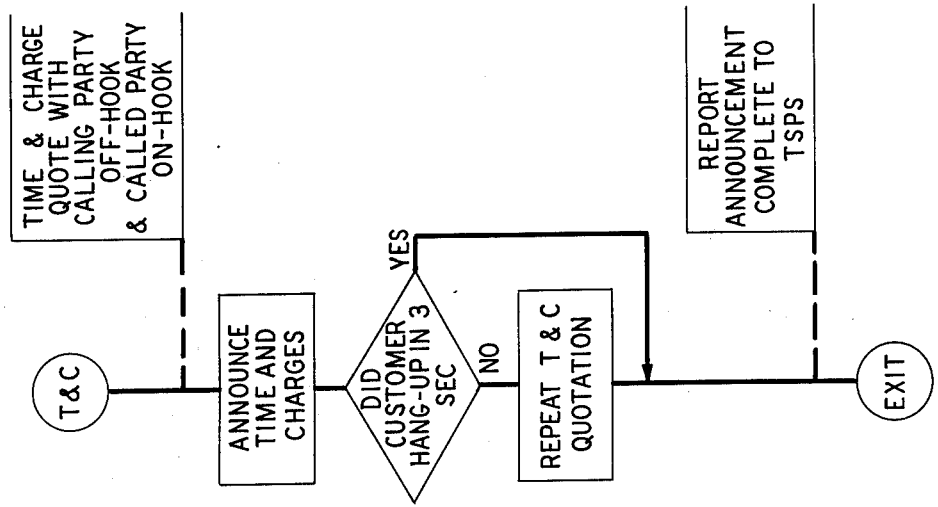
Figure 38:
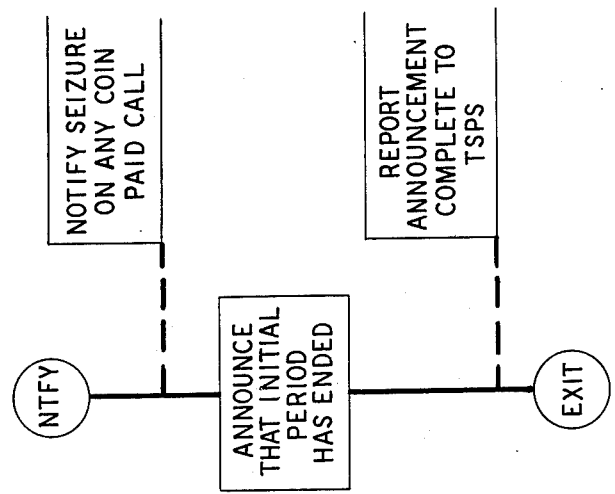
Figure 41:
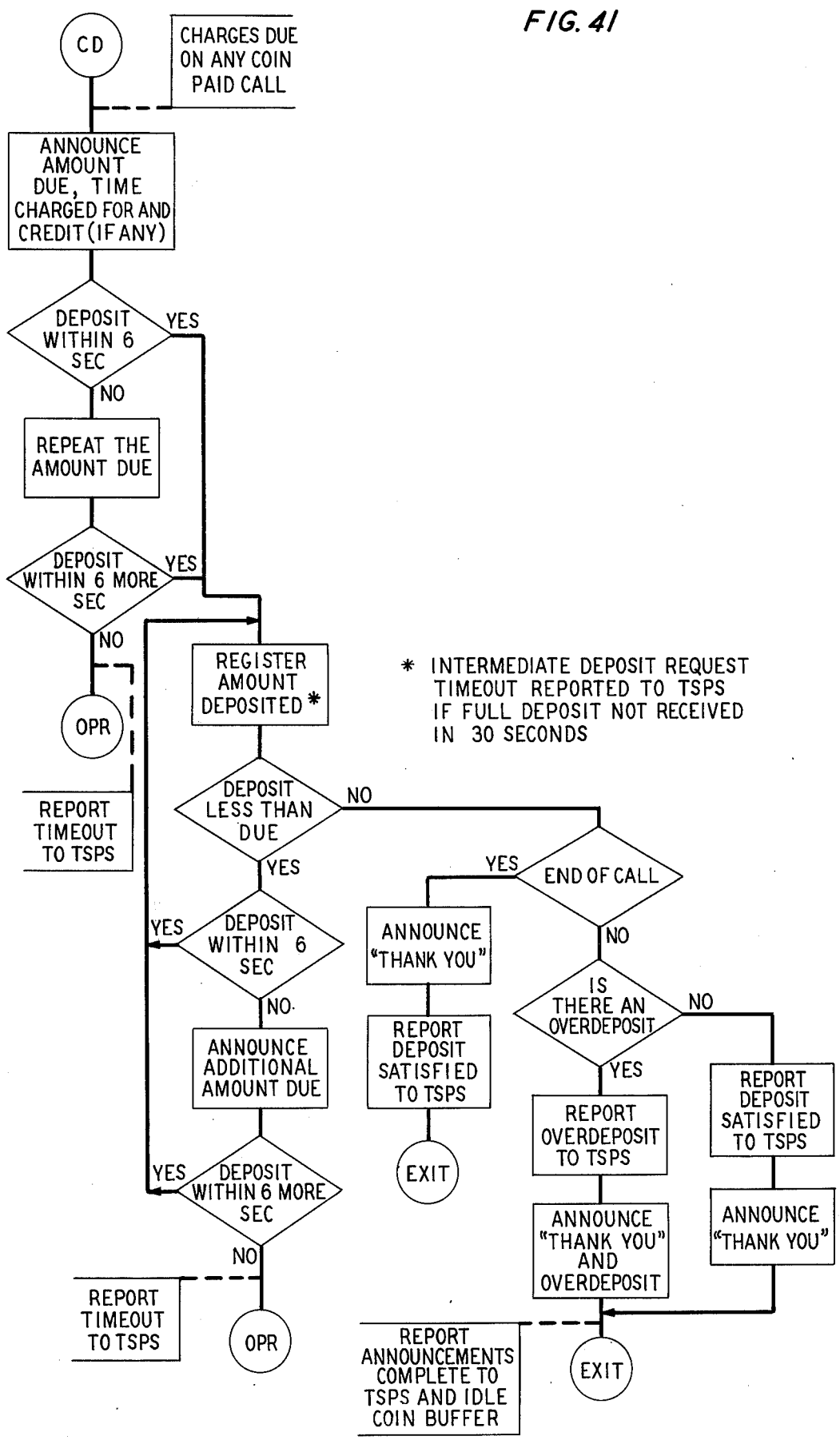

Announcement data is supplied to the announcement circuits ANM- on a time-division basis. With reference to FIG. 12, each 512 ms time period (called a base period) is divided into 400 time frames, each having a duration of 1.28 ms. Each time frame in turn is subdivided into 256 time slots, each having a duration of 5 μs.

Each base period, microprocessor MPO determines for each announcement circuit the announcement memory base address identifying the 512 ms announcement speech segment that the announcement circuit will output during the next 512 ms base period. Thus each base period microprocessor MPO sends via bus OBO a speech segment base address to the announcement machine AMACHO for each announcement circuit. If an announcement circuit must be silenced during the next base period, the announcement machine AMACHO must actually be given the specific digital code for silence. The specifics of the announcement machine and the announcement store will be described in greater detail hereinafter. However, one suitable announcement store ASTRO is a 32K IGFET random access memory as disclosed in F. V. Beck et al U.S. Pat. No. 3,944,800, issued Mar. 16, 1976. Of course, other types of commercial RAMs (or ROMs) are equally suitable.

During each time slot announcement machine AMACHO applies a 40-bit delta modulated encoded digital data word retrieved from announcement store ASTRO during that time slot to the predetermined announcement circuit serviced during the time slot. Parallel to serial converter PS1 converts the parallel 40-bit data words into a serial format and applies the serial data bits onto time division bus TDBO. Each announcement circuit ANM001 through ANM255 receives the 40-bits on bus TDBO during their respective time slots. For example, circuit ANM001 receives the serial binary information on time-division bus TDBO during time slot 1 while announcement circuit ANM255 receives such information during the time slots 255. Since there are 256 time slots and only 240 announcement circuits, it should be apparent that some of the time slots are not utilized for announcement circuit servicing. Actually, time slots 0, 16, 32, . . . , are used for maintenance purposes, and not serving announcement circuits.

Figure 13:
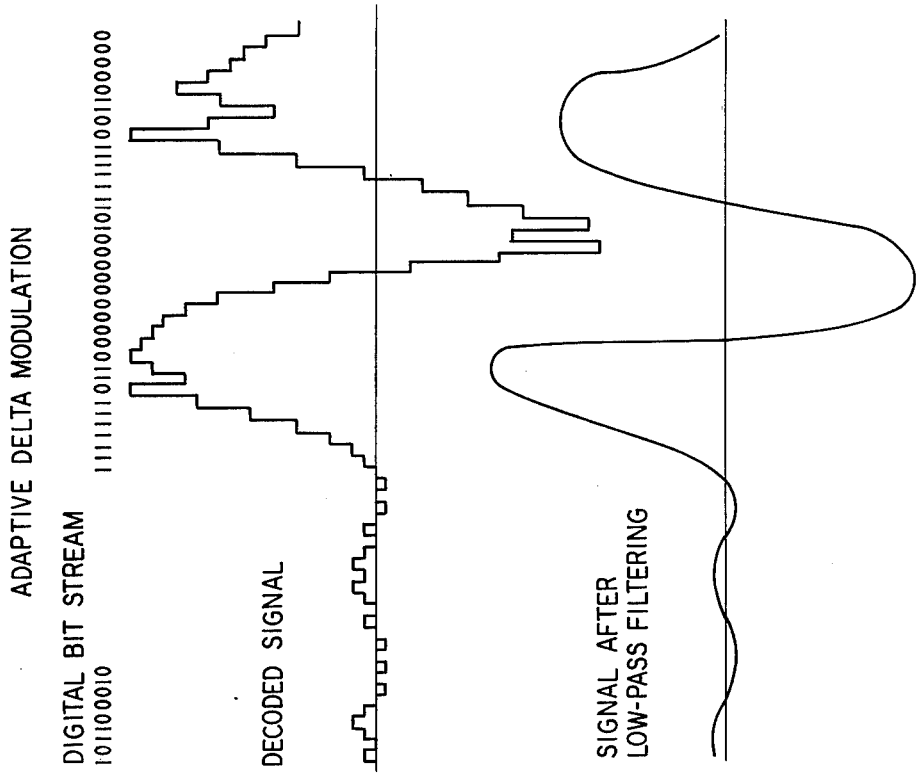
FIG. 13 illustrates how a digital bit stream encoded in an adaptive delta modulated format is first decoded and then filtered to generate audible speech.

Each announcement circuit includes a digital-to-analog converter which decodes the delta modulated encoded data to produce the speech signal. With reference to FIG. 13, a typical digital bit stream is illustrated. This bit stream is encoded in a well known adaptive delta modulation format and, as decoded, generates the waveform designed "decoded signal". The decoded signal is then filtered to produce an audio signal which represents the particular phrase. In delta modulation, a 1 indicates the signal is increasing and a 0 indicates the signal is decreasing. A sequence of alternate 0 an 1s will result in no output signal. In adaptive delta modulation the step sizes are exponential rather than linear. This helps track sharply increasing or decreasing signals. More specifically, if a series of consecutive 1s or 0s is received, the step size is increased. If no such consecutive series is received, then the step size exponentially decays toward zero. FIG. 13 exaggerates the rate of change in step size to clarify the concept. For a suitable adaptive delta modulation system see, for example, S. J. Brolin U.S. Pat. Nos. 3,628,148 and 3,899,754 respectively issued on Dec. 14, 1971 and Aug. 12, 1975.

As mentioned previously 16,000 binary bits are utilized to generate one one half-second phrase. FIG. 13 only indicates a bit stream of approximately 70 binary bits. Thus it should be apparent that the illustrated signal only indicates a very small portion of a word phrase.

The audio outputs from the announcement circuits, such as that illustrated in the bottom of FIG. 13, are applied to the calling subscriber, as previously explained in regard to FIG. 1. Thus the audio output of circuit ANM001 is applied to point X in FIG. 1 and then transmitted through the hybrids via path AP1 to the calling subscriber via leads CS001, path P2 and the T1 conductors. Announcement circuit ANM255 in FIG. 2 is connected to a calling subscriber through leads CS240 in FIG. 1 which are connected to coin circuit CDAM240.

Coin tone detectors CTD001 through CTD240 each include well known dual frequency receivers for detecting 1700 and 2200 Hz tones indicative of coin deposits. As mentioned previously as soon as a start of a coin tone is detected, the tone detector applies a signal on lead INST MUTE to silence the associated announcement circuit. This feature will be described in greater detail hereinafter.

Microprocessor MPO scans each of the coin tone detectors at least twice every base period to receive information pertaining to any coins deposited since the last scan. This is accomplished by supplying address information on output bus OBO to parallel to serial converter PS2. This address information is decoded and selectively enables one of the coin tone detectors to apply coin deposit information to serial to parallel converter PS3. The parallel coin deposit information output by converter PS3 is applied to input bus IBO where microprocessor MPO accesses such information to update the coin deposit portion in memory DRAMO corresponding to the addressed tone detector.

ACS communicates with the SPC utilizing output register ORO and the scan answer bus SCAB. More specifically, microprocessor MPO loads output register ORO in 16-bit segments plus parity. This register is acutally a first-in first-out memory with sufficient storage capacity for 64 words. Approximately every 5 to 100 ms, the SPC scans output register ORO and retrieves one of the 17-bit words stored therein.

The following table summarizes the various commands from the SPC to ACS received in register IRO as well as responses from ACS to SPC placed in register ORO. The data transmitted with each request or response is also listed,

REQUESTS FROM SPC TO ACS (40 BITS MAXIMUM) *IN NICKELS

1. To start initial collection sequence
   a. Coin circuit number (8 bits)
   b. Charges* for initial period (9 bits)
   c. Minutes in initial period (4 bits)
2. To give notification
   a. Coin circuit number (8 bits)
   b. Minutes in initial period (4 bits)
3. To start overtime collection sequence (end of call)
   a. Coin circuit number (8 bits)
   b. Charges* for overtime (9 bits)
   c. Minutes charged (5 bits)
   d. Credit* (4 bits) (if any)
4. To start overtime collection sequence (intermediate)
   a. Coin circuit number (8 bits)
   b. Charges* for overtime (9 bits)
   c. Minutes charged (5 bits)
   d. Credit* (4 bits) (if any)
5. To give T&C quote
   a. Coin circuit number (8 bits)
   b. Charges in binary coded decimal BCD (16 bits)
   c. Minutes charged in BCD (11 bits)
6. To give noncoin notification
   a. Coin circuit number (8 bits)
   b. Minutes (4 bits)
7. To monitor coin deposit
   a. Coin circuit number (8 bits)
   b. Amount* to be deposited (7 bits)
8. To monitor deposit with large charges
   a. Coin circuit number (8 bits)
   b. Amount* to be deposited (9 bits)
   c. Coin hopper capacity (7 bits)
9. To indicate coin return - coin circuit (8 bits)
10. To indicate coin collect - coin circuit (8 bits)
11. To report total deposit - coin circuit (8 bits)
12. To stop announcement sequence - coin circuit (8 bits)
13. To idle coin circuit (initialize) - coin circuit (8 bits)
14. To report total deposit and idle coin circuit - coin circuit (8 bits)
15. To report total deposit and stop announcements if deposit not satisfied - coin circuit (8 bits)

RESPONSES FROM ACS TO SPC (20 BITS MAXIMUM) *IN NICKELS

1. Deposit satisfied
   a. Coin circuit number (8 bits)
2. Overdeposit occurred
   a. Coin circuit number (8 bits)
   b. Amount* of overdeposit (4 bits)
3. Announcement of requested action complete and buffer idled
   a. Coin circuit number (8 bits)
4. Unsatisfactory deposit detected (time-out)
   a. Coin circuit number (8 bits)
5. Total deposited detected
   a. Coin circuit number (8 bits)
   b. Amount* deposited (7 bits)
6. Fraud suspected
   a. Coin circuit number (8 bits)
7. Deposit satisfied and circuit idled
   a. Coin circuit (8 bits)
8. Overdeposit and circuit idled
   a. Coin circuit (8 bits)
   b. Overdeposit* (4 bits)
9. Underdeposit and circuit idled
   a. Coin circuit (8 bits)
   b. Amount* deposited (7 bits)

ARCHITECTURAL DUPLICATION IN ACS

Figure 3:
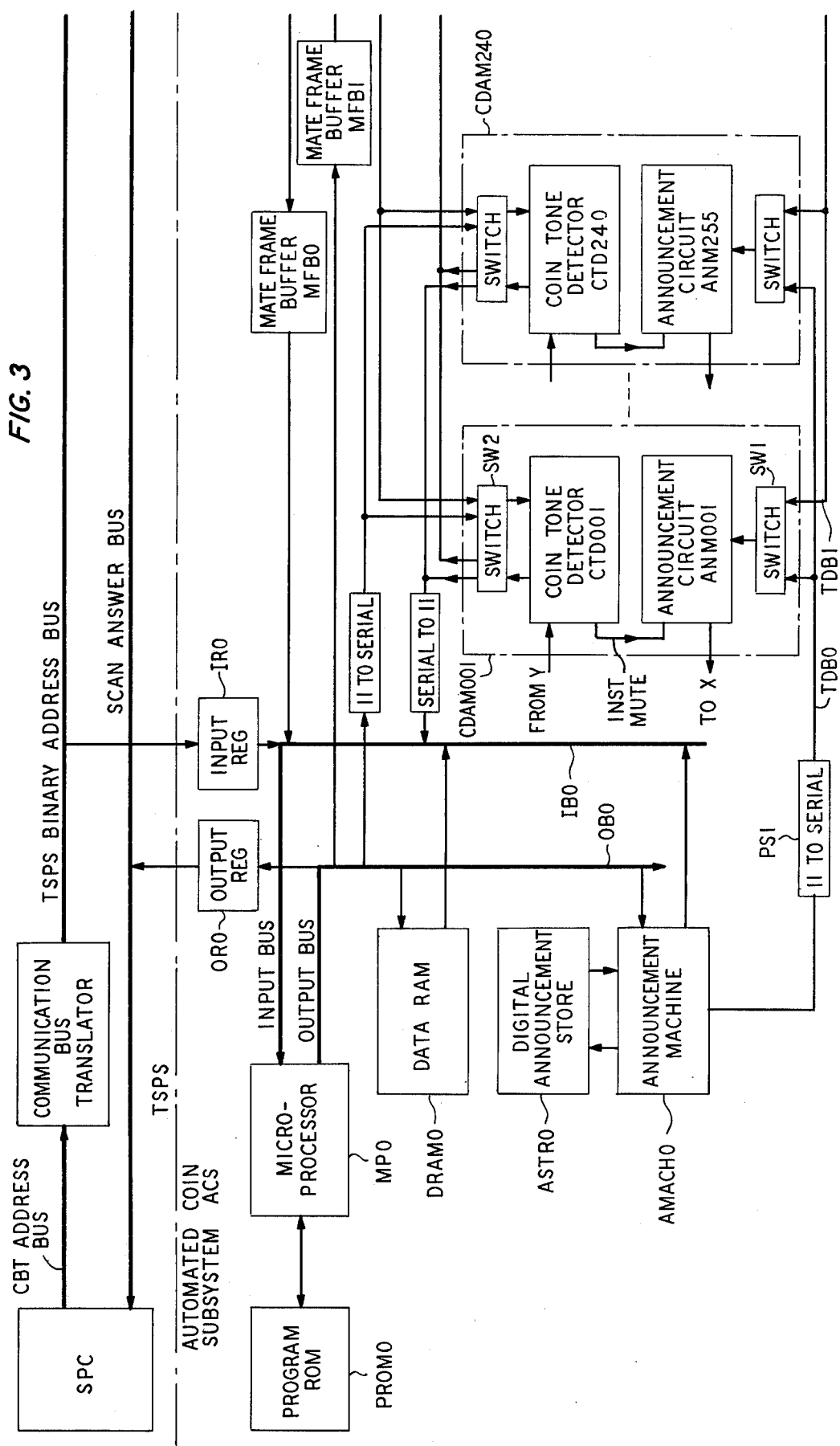
FIGS. 3 and 4 illustrate the manner in which the circuitry in FIG. 2 is duplicated to provide for more reliable operation.
Figure 4:
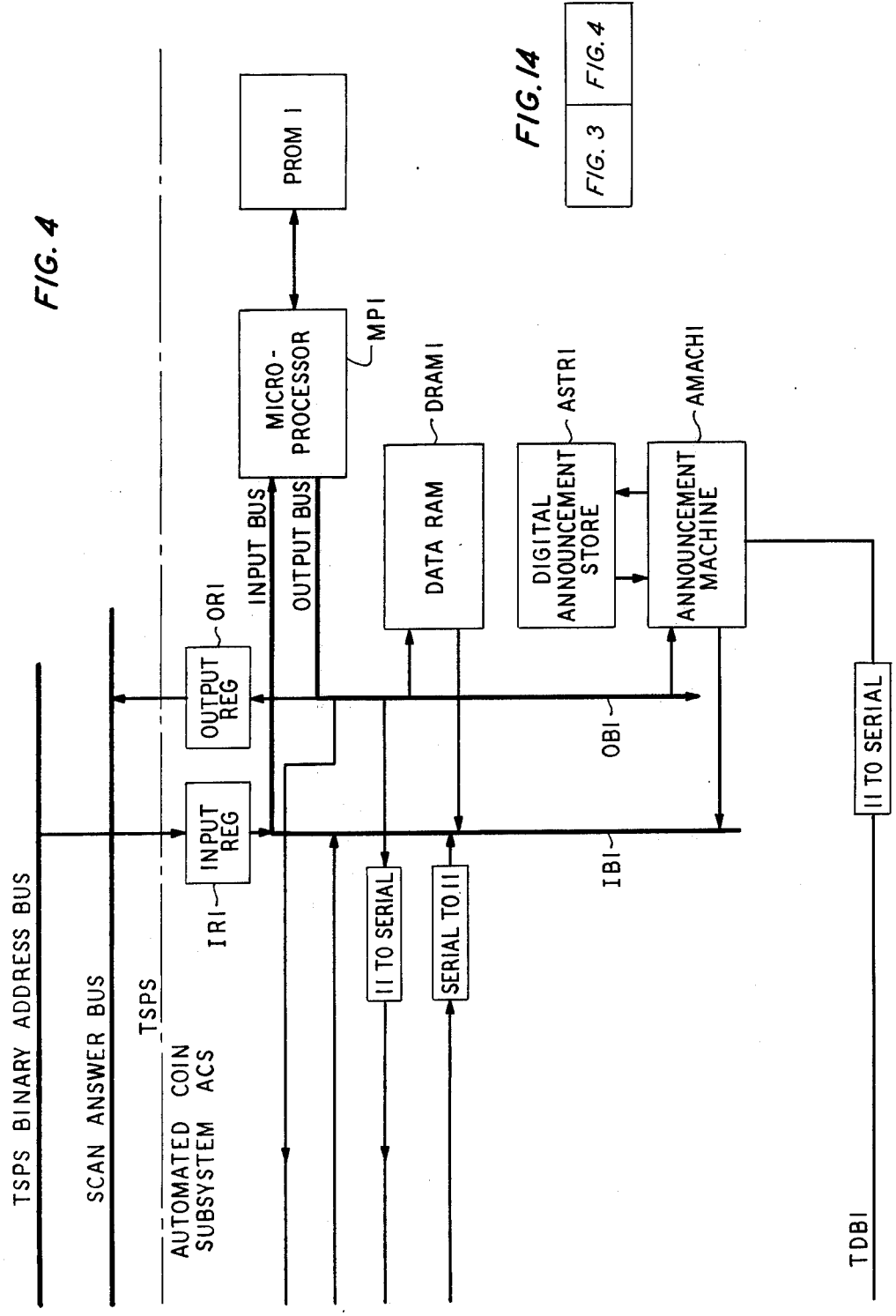

FIGS. 3 and 4 when combined as shown in FIG. 14 illustrate how the circuitry previously described in regard to FIG. 2 is actually duplicated to ensure reliable, fault free operation. Each microprocessor (i.e., MPO in FIG. 3 and MP1 in FIG. 4) and all their peripheral equipment are duplicated (e.g. data RAM-DRAMO in FIG. 3 and DRAM1 in FIG. 4). However, the tone detectors and announcement circuits in each coin circuit are not duplicated.

Each microprocessor (MPO and MP1) operates asynchronously and no matching is conducted between the microprocessor outputs; rather one microprocessor is placed in an active mode by the SPC and is given control over the coin circuits via switches SW1 and SW2 which are operated by the SPC and this active microprocessor actually controls the announcing and coin detecting. The other microprocessor is placed in a standby mode in which it continues to perform normal data processing but its outputs do not control the announcement circuits or tone detectors.

Each microprocessor processes commands received from the SPC via their respective input registers IRO and IR1, in the manner previously described. They send information to the SPC via output registers ORO and OR1, respectively.

Mate frame buffers MFBO and MFB1 in FIG. 3 are provided to pass information from the output bus of one microprocessor to the input bus of the other microprocessor. Each buffer is a first-in first-out memory storing 256 words, each of which is 16 bits wide plus a parity bit. The primary purpose of the mate frame buffer is to keep the data RAM memory DRAM- in the standby microprocessor updated each time the active DRAM receives data from the active microprocessor. To achieve this, whenever the active microprocessor (assume MPO is active) writes data into its data RAM (DRAMO), the address of the data and the data itself are written in to mate frame buffer MFB1 as well. The standby microprocessor MP1 unloads the address and data from mate frame buffer MFB1 and writes the data in its own data RAM DRAM1 at the designated address. The blocks of data in the data RAMs DRAMO and DRAM1 are similarly assigned, so each coin circuit is identified by the same group of addresses in each of the data RAMs.

To simplify the detailed description of the illustrative embodiment of my invention to the maximum extent possible, all further discussion concerning the microprocessors will be with reference to the active microprocessor hereinafter assumed to be MPO. However, the standby processor is keeping a copy of all information written into the DRAM.

Two sets of switches are provided in each coin circuit to direct information from the active microprocessor to the announcement circuits and coin detector. For example, with reference to coin circuit CDAM001 in FIG. 3, switch SW1 is set by the SPC using a central pulse distributor command to gate information from the "active" time-division bus TDBO or TDB1 into announcement circuit ANM001. Similarly switch SW2 in coin circuit CDAM001 is set to only accept address information from the active microprocessor and only to apply coin deposit information to the active microprocessor.

DETAILED DESCRIPTION OF ACS

FIGS. 5 through 10 when combined as shown in FIG. 11 illustrate the detailed structure in an unduplicated ACS. More specifically, the following describes in more detail the unduplicated microprocessor structure previously discussed in regard to FIG. 2. Where appropriate, however, the connections to the other microprocessor structure are illustrated.

Figure 5:
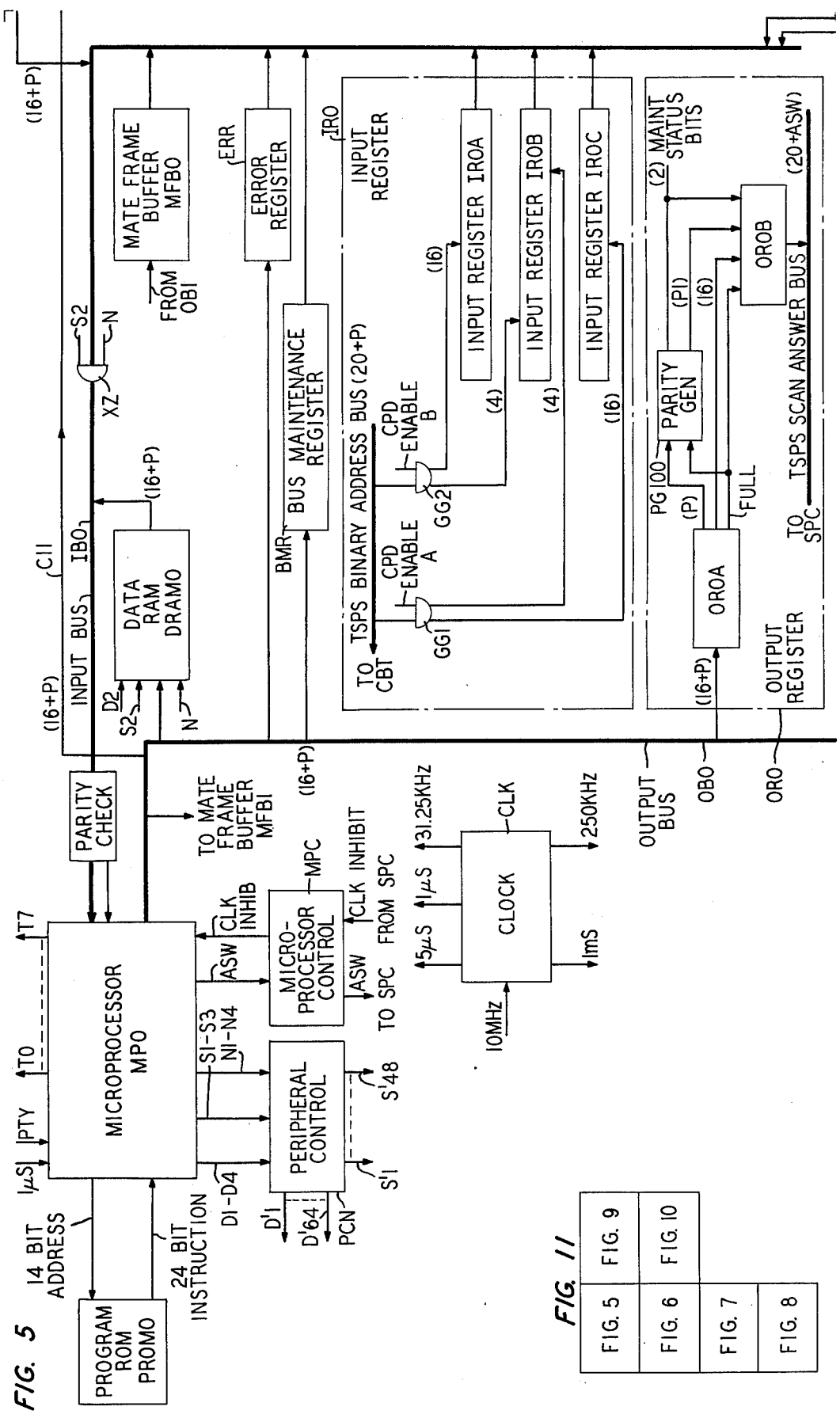
FIGS. 5-10 when combined as shown in FIG. 11 illustrate in greater detail the unduplicated microprocessor system previously generalized in regard to FIG. 2.

The heart of ACS is microprocessor MPO in FIG. 5. The basic program store is program read only memory PROMO. Memory locations in this memory are identified by a 14-bit address. Twenty-four bit instructions are received by microprocessor MPO, decoded, and then executed to control the operations of ACS. Microprocessor MPO controls the gating of information to and from its peripheral devices using the D,S and N leads. Peripheral control circuit PCN is responsive to the state of leads D1-D4 and N1-N4 for selectively providing an enable signal on one of the destination leads D'1-D'64. Each of these "destination" leads is connected to a specific register or similar device and serves to gate the information to the associated register from output bus OBO.

The gating of information onto input bus IBO is controlled by "source leads" S'1 through S'48. Peripheral control PCN selectively energizes one of these source leads responsive to the states of leads S1-S3 and N1-N4. To simplify the drawing as much as possible, the particular D' and S' leads associated with the various registers are not shown. However, each time information is gated into a register or gated from a register, it should be understood that such gating is performed under the control of the D' and S' leads associated with that register.

As mentioned previously, microprocessor MPO is a self-checked machine with duplicated data manipulation units. If a severe failure is detected, the state of the all seems well lead ASW is changed. Such failures are described in S. D. Coomer application Ser. No. 626338 filed Oct. 28, 1975, now U.S. Pat. No. 4,020,459 issued Apr. 26, 1977, for example. Microprocessor control circuit MPC, responsive to the state of lead ASW, inhibits the clock of microprocessor MPO if a malfunction is detected thereby halting MPO and preventing data mutilation. The state of lead ASW is also passed to the SPC via its scanner, so the SPC can determine when an active microprocessor has encountered a failure condition and can act accordingly to switch the active and standby states of microprocessors MPO and MP1. The SPC also includes a central pulse distributor point for inhibiting the clock in microprocessor MPO over lead CLK INHIB to inhibit its further operation to prevent the mutilation of data therein. Clock CLK in FIG. 5 is responsive to a 10 MHz square wave for generating the various timing signals utilized in ACS. To simplify the drawing, the clock outputs are not connected to each of the circuits which receive such outputs, but the principle clock inputs are shown at individual circuits.

Microprocessor MPO communicates with its peripheral devices over a 17-bit input bus IBO, and 17-bit output bus OBO. These 17 bits include 16 data bits plus a parity bit designated P. The number of bits which are included in particular cables in the various figures are indicated in parentheses and the the parity bit P is indicated as such. Thus for example, output bus OBO also includes the designation (16+P).

Transient information pertaining to the coin circuits is stored in data random access memory DRAMO in FIG. 5. Two 1 $\mu$s processor cycles are required to read or write memory DRAMO. The address of the word is loaded onto an address register (not shown) in DRAMO during the first cycle. A data read or write at the addressed memory location is accomplished on the next processor cycle, with the word to be written input from the bus OBO, or the word to be read from memory DRAMO output onto input bus IBO.

Mate frame buffer MFBO, as mentioned previously, is a 64-word, first-in, first-out memory. Microprocessor MP1 (when active) loads data into buffer MFBO and microprocessor MPO (when standby) reads the data from buffer MFBO onto input bus IBO. As mentioned previously, this buffer permits the active microprocessor to write data into the buffer while the standy microprocessor reads data from the buffer. This data is utilized to update the data RAM in the standby microprocessor. While both microprocessors load data into their MFB, only the standby microprocessor normally reads the active side MFB.

Error register ERR in FIG. 5 is connected to input bus IBO. Each bit of this register is connected to a particular monitoring point (e.g., parity checks) in the associated ACS half. Microprocessor MPO periodically reads the contents of this register to process any detected errors. Bus maintenance register BMR in FIG. 5 is utilized to send data from the output bus to the input bus for use in fault diagnosis.

Messages from the SPC are received from the communications bus translator on the TSPS binary bus. This is an ac bus with 20 data bits and 1 parity bit. Most messages from the SPC to the ACS require 40 bits. Therefore, generally two 20-bit words are sequentially loaded into ACS. With reference to FIG. 5, the first 20-bit word is loaded into input registers IROB and IROC responsive to an enable pulse from the central pulse distributor in TSPS which enables symbolic gate GG1. Earlier herein these registers and IROA were jointly designated IRO. Four bits are loaded in register IROB and 16 bits are loaded into register IROC. When the next 20-bit word is loaded onto the binary address bus symbolic gate GG2 is enabled by the central pulse distributor and 16 bits of the 20-bit word are loaded into register IROA and the remaining 4 bits are loaded in the register IROB.

Microprocessor MPO periodically unloads information from these input registers to detect any commands received from the SPC. Since microprocessor MPO and the input bus are 16 bits wide plus parity only one of the input registers IROA-IROC is read during a 1 μs machine cycle.

Information from ACS is sent to the SPC via the TSPS scan answer bus. Two 20-bit output registers OROA and OROB in FIG. 5 are provided. Register OROA is loaded with 17 bits from the output bus. When data is stored in register OROA, lead FULL is enabled. Responsive to the state of this lead, parity generator PG100 generates a new parity bit on lead P1 over the parity bit output by register DROA, the FULL lead and two maintenance status bits. Twenty bits of data are then gated into register OROB (if it has been emptied by the SPC), namely the FULL indication, the 16 bits of data, the two maintenance status bits, and the parity bit P1 over each of the previous 19 bits. The TSPS scans register OROB at least every 100 ms and, depending upon the state of the bit FULL, determines whether another scan is required to receive a second word, temporarily stored in register OROA.

THE DIGITAL ANNOUNCEMENT STORE

Figure 6:
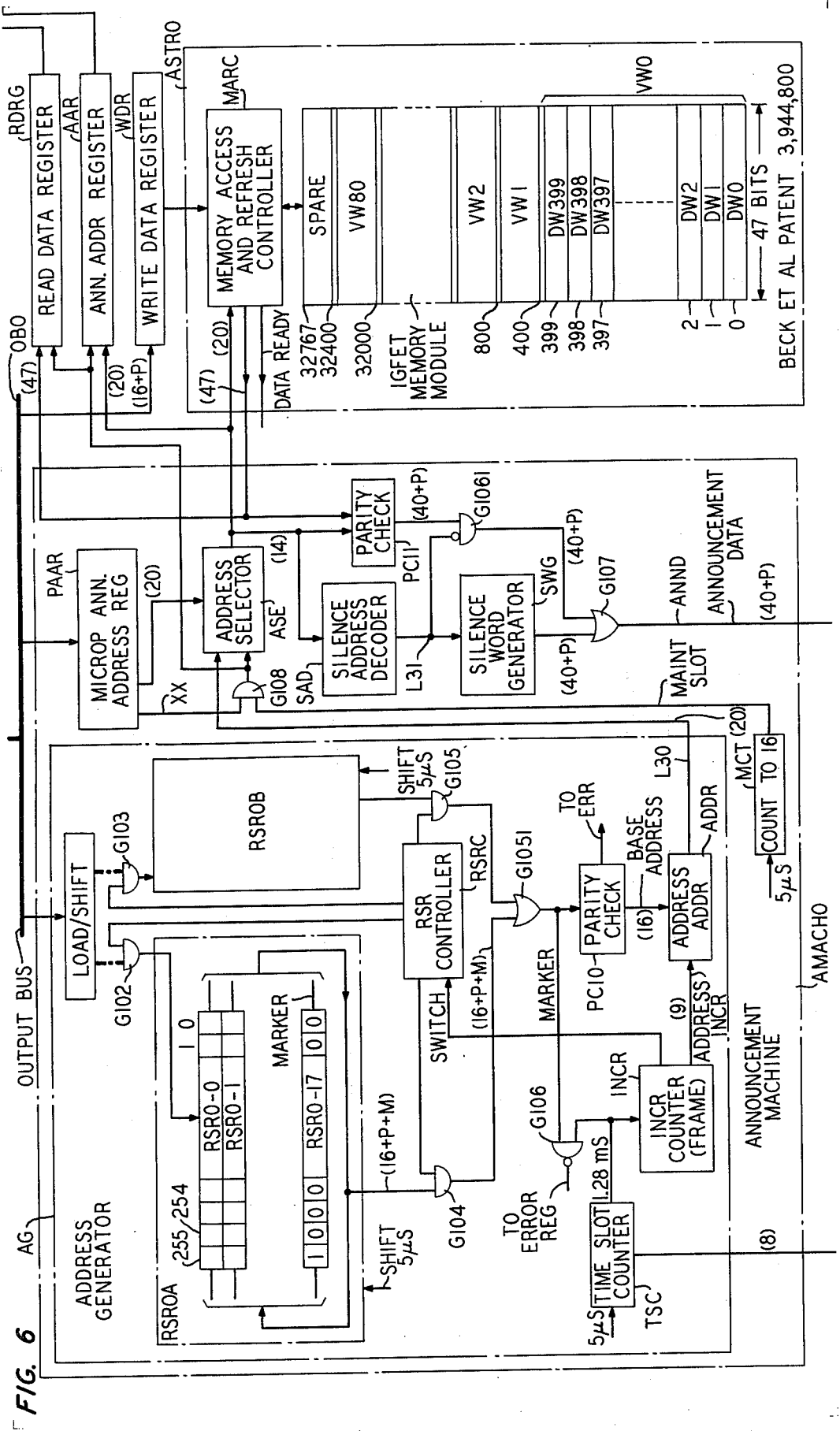

Digital announcement store ASTRO is depicted in FIG. 6. In this one illustrative embodiment of my invention, the memory contains 32,768 47-bit words. In each 47-bit word, 40 bits are utilized for data storage; 6 bits are used for a Hamming code over the 40 data bits and 14 of the address bits, and a single parity bit is provided over the data, address and Hamming bits. Memory access and refresh controller MARC provides registers to buffer address and data, common logic to recognize processor commands, and circuits to generate common timing signals necessary to access the IGFET memory module. The data in the memory is periodically refreshed automatically by the controller to maintain the viability of the stored information. One suitable memory is described in some detail in the previously-mentioned Beck et al. patent. As the number of vocabulary words increases, additional memory modules can be added.

The memory module is utilized to store 80 half-second vocabulary phrases respectively designated VW0 through VW80. Each vocabulary word comprises the information in 400 consecutively addressed memory locations. For example, vocabulary word VW0 comprises data words DW0-DW399 respectively stored in absolute memory address locations 0-399. Similarly, vocabulary word VW1 is stored at absolute memory addresses 400 through 799. Each vocabulary word is utilized to produce a speech segment having a duration of 512 ms. At a speech sampling rate of 31.25 kHz, a 512 ms speech segment comprises exactly 16,000 data bits (i.e., 40 bits × 400 words).

As mentioned previously, FIG. 12 illustrates the basic "time" division arrangement utilized to service the various announcement circuits ANM001-ANM255. As mentioned previously, each base period of 512 ms, corresponding to the duration of each vocabulary word, is divided into 400 time frames and each time frame is subdivided into 256 time slots. Time slots 0, 16, 32, . . . , are used only for maintenance purposes, as hereinafter described. Each of the other time slots is permanently assigned to an announcement machine. For example, time slot 1 is reserved for announcement circuit ANM001 while time slot 2 is reserved for announcement circuit ANM002. The particular time slot assignments will be hereinafter explained more fully; however, each announcement circuit receives a 40-bit data word in its associated time slot. Thus each time frame, each announcement circuit receives 40 data bits and, accordingly, each base period of 512 ms, each announcement circuit receives four hundred 40-bit data words.

FIG. 6 also illustrates announcement machine AMACHO which operates to supply the addresses at which memory ASTRO is successively accessed to apply the proper digital data to the announcement circuits. To elaborate, the announcement machine includes address generator AG which utilizes hardware to generate the proper address each time slot. More specifically, each base period microprocessor MPO loads all the base addresses associated with the vocabulary words to be sent to each announcement circuit during the next base period of 512 ms. For example, assuming that vocabulary word VW2 (e.g., "Please") is to be applied to announcement circuit ANM001 while vocabulary word VW0 (e.g., "one") is to be applied to announcement circuit ANM002, microprocessor MPO loads into recirculating shift register RSROA at the proper time slot locations base address 800 for vocabulary word VW2 and base address 0 for vocabulary word VW0.

Eighteen shift registers designated RSRO-0 through RSRO-17 are provided in recirculating register RSROA. The contents of these registers are concurrently shifted one bit position to the right for each time slot. Initially, the base address for time slot 0 is stored in the rightmost column of 18 bits, while the base address for time slot 1 is stored in the next group of 18 vertical bits, while the base address for time slot 255 is stored in the leftmost vertical column of shift register bits. The 18 bits for each time slot base address actually comprise 16 data bits identifying a base address in memory ASTRO, a parity bit over the data and a marker bit which is stored in a special register RSRO-17. The only purpose of the marker bit is to synchronize the shifting of these registers with the operation of a time slot counter, as hereinafter explained.

While recirculating shift registers RSROA are shifted every 5 μs time slot to indicate the base addresses of the instant time slots, structurely identical, recirculating shift registers RSROB are being loaded by MPO with the next group of base addresses for the next set of 512 ms vocabulary words (i.e., next base period). Every base period, the roles of registers RSROA and RSROB are reversed. Every base period, RSR controller RSRC selectively energizes either gate G102 or G103 to allow microprocessor MPO to enter the base addresses for the next 512 ms period in either registers RSROA or RSROB, respectively. RSR controller RSRC also selectively energizes one of the gates G104 or G105 to allow the base addresses from the "active"-recirculating shift registers to be applied to OR gate G1051. The marker bit output from register RSRO-17 is applied to gate G106 where it is compared with an output signal from time slot counter TSC. More specifically, counter TSC counts from 0 to 255 to identify the current 5 μs time slot and then overflows every 1.28 ms (time frame) to increment time frame counter INCR. Shift register RSRO-17 stores all 0s except for a 1 in bit position 255. So this 1 in bit position 255 should be gated to gate G106 during time slot 255 at which time, time slot counter TSC should generate a HIGH output to increment counter INCR. The absence of correspondence between these two timing signals (i.e., as indicated by the output of gate G106) indicates that the shift registers and time slot counter are out of synchronism. Accordingly, announcements are not being sent to the proper announcement circuits.

Incremental counter INCR indicates the time frame number. This counter counts from 0 to 399 responsive to the overflow every 1.28 ms from counter TSC. The data and parity bit information output by gage G1051, as explained previously is applied to parity check PC10. If a parity error is detected, a particular bit in register ERR in FIG. 5 is set. The 16 data bits indicating the base address during the instant time slot are applied to address adder ADDR which adds the base address to the incremental or frame address output by counter INCR and applies the resultant sum to address selector ASE via leads L30. For example with reference to FIG. 12, during time frame number 0 and time slot 1, base address 800 corresponding to vocabulary word VW2 is applied to address adder ADDR from the rightmost vertical bit column in registers RSROA, while incremental address 0 is applied thereto from counter INCR. The data at absolute address 800 will be accessed (i.e., base address 800 + incremental address 0 =800). During time slot 1 of the next time frame one, the recirculating shift registers RSROA will still indicate base address 800. However, time frame counter INCR now indicates incremental address 1. Accordingly, address 801 will be output from address adder ADDR to memory ASTRO and the data word stored thereat will be applied to announcement circuit ANM001 during time slot 1. Similarly during time slot 1 of time frame number 399, incremental counter INCR will indicate the number 399 which will be added to base address 800. Accordingly, the data word at address 1199 (i.e., 800+399) will be applied to announcement circuit ANM001. Thus, during time slot 1 of successive time frames 0–399, addresses 800–1199 will be applied to memory ASTRO and data words DW800–DW1199 will be applied to announcement circuit ANM001 to generate the 512 ms phrase "please".

Similarly during time slot 2 and time frame number 0, a 0 will be added to base address 0 (the address of vocabulary word 0) and the data word DW0 at address 0 will be applied to announcement circuit ANM002. Finally, during time slot 2 of time frame number 399, data word DW399 stored at address 399 will be retrieved from memory ASTRO and applied to announcement circuit ANM002 because address adder ADDR will add the frame number 399 to the base address 0 received from register RSROA during time slot 2. Thus during time slot 2 of successive time frames 0–399, addresses 0–399 will be applied to memory ASTRO and data words DW0–DW399 will be applied to circuit ANM002 to generate the phrase "one".

Returning now to FIG. 6, during each time slot the 20-bit address identifying a data word to be applied to an announcement circuit is applied to address selector ASE over leads L30. Address selector ASE normally gates the 20-bit address to controller MARC which accesses the data word stored at the specified address and applies the accessed 47-bit data word to parity check circuit PC11. This circuit checks parity over the 47 bits and also checks the validity of the Hamming code and outputs the 40 data bits plus parity to gate G106. The 40 data bits plus parity are applied through OR gate G107 to the associated announcement circuit in FIG. 8 as hereinafter explained.

As mentioned previously, if an announcement circuit is to be silenced during a time frame, it must still receive serial digital information during its own time slot which causes it to generate no audio output (e.g., 010101 ... ). Silence address decoder SAD is responsive to particular address name codes which indicate that the announcement circuit is to be "silenced" during the instant time slot. When decoder SAD detects one of these "silent" addresses, it generates a HIGH output on lead L31 to disable gate G106. This inhibits any information output from memory ASTRO from being applied to the announcement circuit, identified by the instant time slot. Responsive to the HIGH signal on lead L31, silence word generator SWG generates a data word including a 40 bit series of alternating 1s and 0s which word is gated through gate G107 to the announcement circuit served during the instant time slot.

As mentioned previously certain of the time slots are not utilized to service announcement circuits. These time slots are spaced every 16 time slots. Time slots 0, 16, 32, etc. are maintenance time slots. These maintenance time slots are identified by a HIGH output on MAINTSLOT from counter MCT. This counter counts from 1 to 16 responsive to the 5 μs clock output which delineates the time slots. If microprocessor MOP wishes to access memory ASTRO during one of the maintenance time slots, it loads an address in register PAAR in FIG. 6. The leftmost bit of this address is a 1 which enables gate G108 via lead XX to apply the HIGH output of counter MCT to address selector ASE. Responsive to this HIGH signal, address selector ASE selects the 20-bit address in register PAAR rather than the 20-bit address output by address adder ADDR. The 47-bit data word retrieved from memory ASTRO at the address indicated by register PAAR is then gated into read data register RDRG by the HIGH output of gate G108. Microprocessor MPO gates out information in register RDRG in 17 bit portions. Moreover, announcement address register AAR is also enabled by the HIGH output of gate G108 to store the 20-bit address output from selector ASE. The address information is then gated from register AAR onto the output bus under the control of microprocessor MPO.

When microprocessor MPO desires to write information into memory ASTRO, write data register WDR is loaded with data from output bus OBO. This data is stored at the address location identified by the contents of register PAAR, as previously described, during the next maintenance time slot as identified by counter MCT.

DISTRIBUTION OF ANNOUNCEMENT DATA

Figure 7:
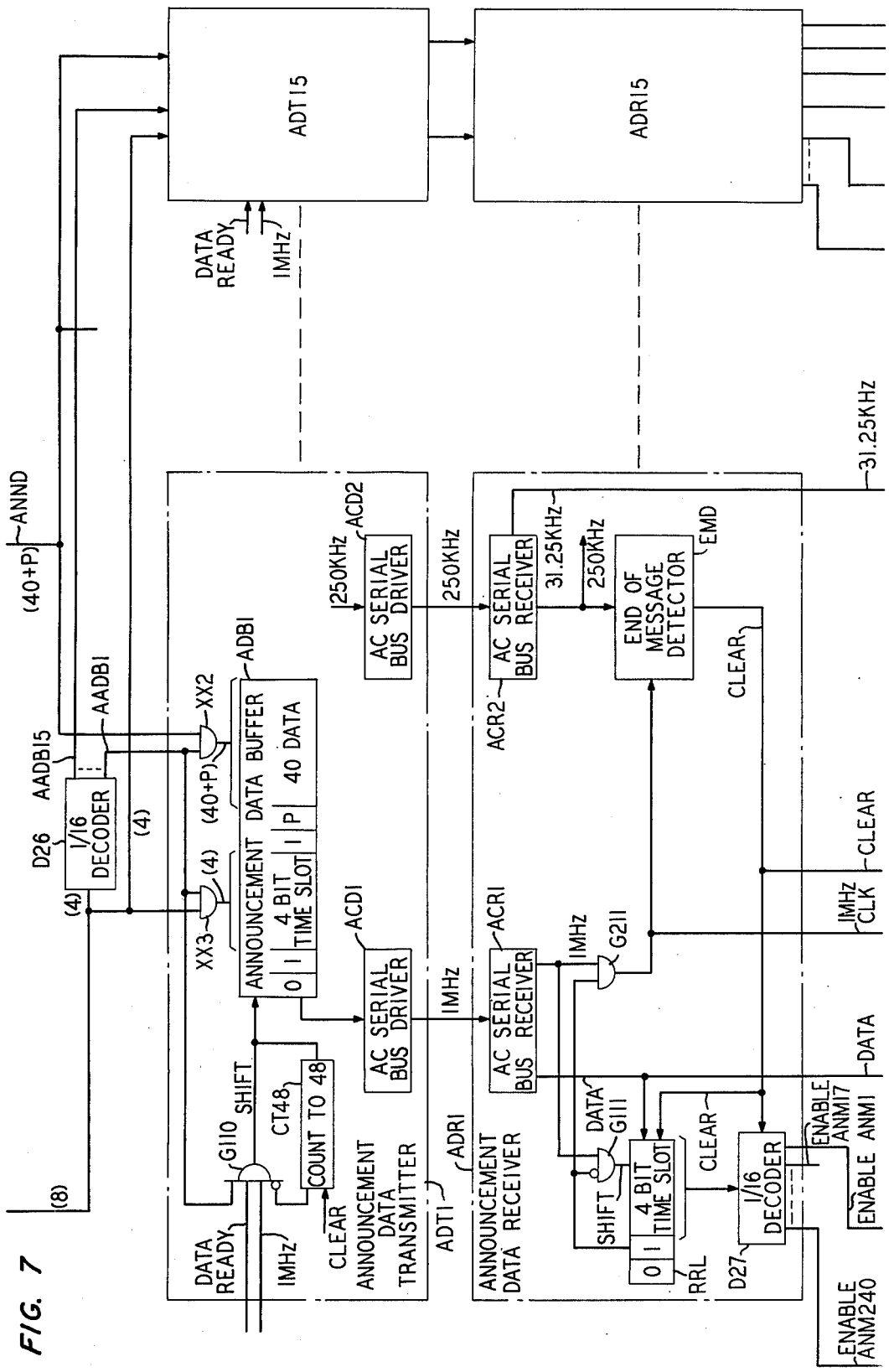
Figure 8:
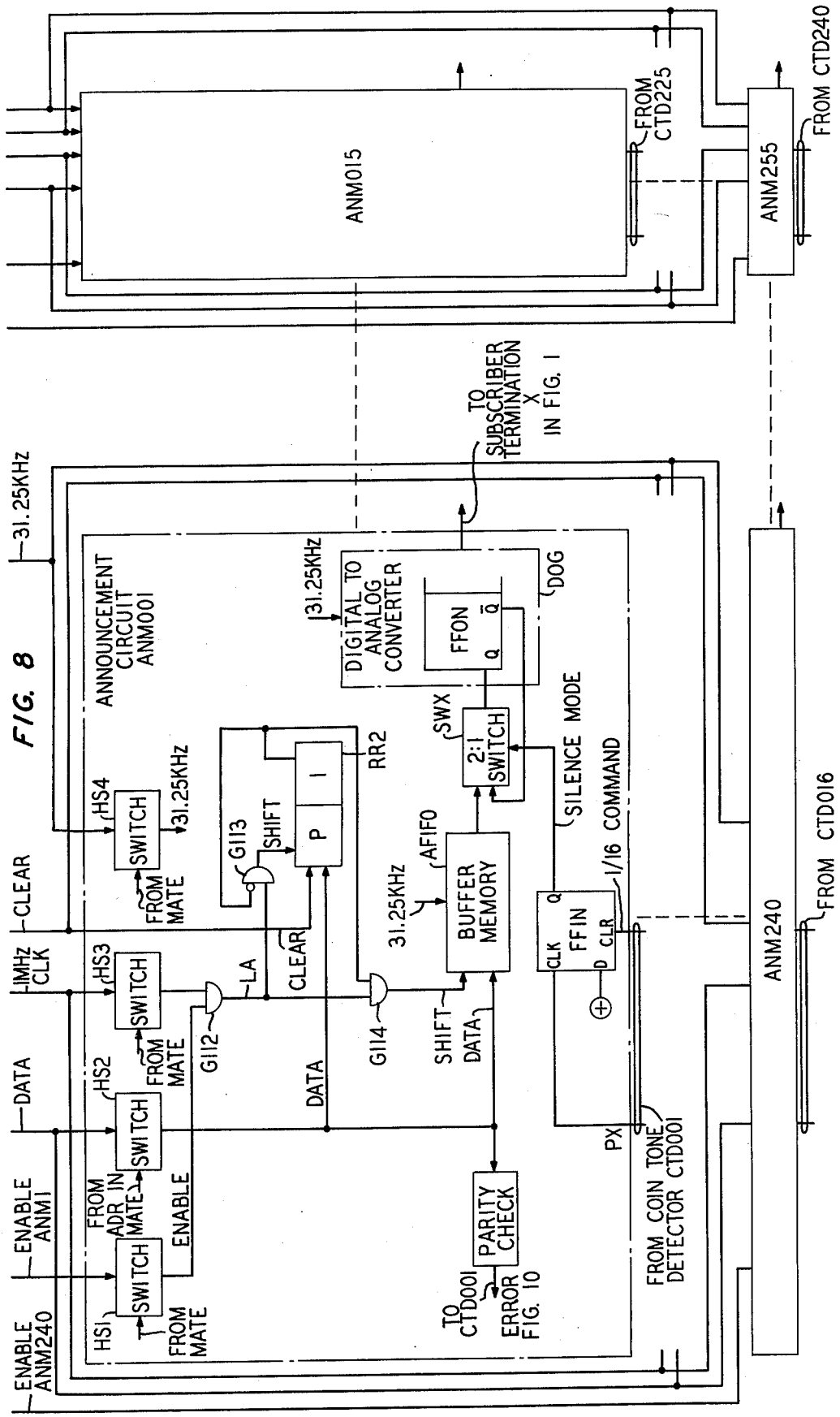

During each time slot, the 40 data bits output by memory ASTRO are applied to the circuitry in FIG. 7 over leads ANND. Also, the 8-bit time slot information in counter TSC is applied to the circuitry in FIG. 7. Announcement data is changed from a parallel to a serial format and communicated over an ac bus which applies the serial data to its destination announcement circuit such as ANMOO1 in FIG. 8. More specifically, the announcement circuits are organized into 15 groups of 16 anouncement circuits. The 15 groups are respectively served by announcement data transmitters ADT1-ADT15. For example, as shown in FIG. 8, announcement circuits ANM001, ANM017, ANMO33 . . . ANM240 are in the first group and served by ADT1, while announcement circuits ANM015, ANM031 . . . ANM255 are in the last group and served by ADT15. As mentioned previously, there are 256 time slots and 240 announcement circuits. Accordingly, some of the time slots are not utilized by announcement circuits. For example, there are no announcement circuits ANM000, ANM016, ANM032, . . . .

The announcement group identification for the instant time slot is performed by one-out-of-16 decoder D26 in FIG. 7. This decoder is responsive to the least significant 4 bits of time slot counter TSC and generates an enable signal on one of the leads AADB1 through AADB15 to selectively enable one of the announcement data transmitters ADT1 through ADT15 to receive the parallel 40 bits of announcement data from memory ASTRO. Assuming that counter TSC indicates time slot 1, decoder D26 generates an enable signal on lead AADB1. This signal enables gate XX2 to gate the 40-bit data word and parity thereover into announcement data buffer ADB1. The four most significant bits in time slot counter TSC are also gated by gate XX3 into the appropriate bit positions in announcement data buffer ADB1, which is 48 bits long. Responsive to a DATA READY signal from memory acces controller MARC in FIG. 6 provided when the output data stabilizes, gate G110 gates 1 MHz shift pulses into shift ADB1 to serially gate out the 48 bits therein. The bits are applied at a 1 MHz rate to AC serial bus driver ACD1 which transmits the 48 data bits at a 1 MHz rate in serial to AC serial bus receiver ACR1. W8en counter CT48 counts 48 shift pulses, it disables gate G110 inhibiting the further transmission of serial data. AC serial transmission of the data bits is utilized rather than DC parallel transmission so that the announcement circuits do not have to be physically associated with the microprocessor complex. It is anticipated that the announcement circuits will be associated with the TSPS network and hybrid circuits described previously.

Bus receiver ACR1 derives a 1 MHz clock from the received data in the normal manner and utilizes this clock to enable gate G111 to shift the first 6 bits of the 48-bit word into register RRL. When the first 6 bits have been received in register RRL, the 1 bit gated into the second bit position disables gate G111 so that no further data is gated into register RRL. One-out-of-16 decoder D27 decodes the 4 most significant time slot bits in register RRL to select the particular announcement circuit in the group of 16 announcement circuits which is to receive the serial data Since we have assumed that counter TSC in FIG. 6 indicated time slot 1, decoder D27 enables lead ANM1 which enables announcement circuit ANM001. Lead ANM1 energizes gate G112 in FIG. 8 to gate the 1 MHz clock signal onto lead LA. These clock signals are applied to gate G113 which applies shift pulses to register RR2. Register RR2 responsive to these shift pulses begins to gate data from lead DATA. After two bits have been received (i.e., a 1 and then P, in that order), the one in the rightmost position generates a HIGH output which disables gate G113 to prevent the further shifting of data into register RR2. Gate G114 is also enabled and now applies the 1 MHz shift pulses to memory AFIFO which, responsive to these shift pulses, gates in the 40 data bits serially received from lead DATA. Memory AFIFO is 64 bits long and operates on a first-in, first-out basis. The information in memory AFIFO is gated out at a 31.25 kHz rate through switch SWX to digital-to-analog converter DOG. This converter, responsive to the 31.25 kHz clock, decodes the adaptive delta modulated serial binary information into an audio signal which is applied to subscriber termination X in FIG. 1.

The clock information which is received by announcement circuit ANMOO1 is derived from a 250 kHz signal transmitted by announcement data transmitter ADT1 in FIG. 7. More specifically, this clock signal is transmitted by AC serial bus driver ACD2 to AC serial bus receiver ACR2. Receiver ACR2 derives a 31.25 kHz clock by dividing the 250 Hz signal by 8. This 31.25 kHz signal is applied to announcement circuit ANM001 to control memory AIFIO and converter DOG.

During time slot 2, the 40-bit serial data word output from memory ASTRO is applied to announcement circuit ANM002, which is not shown in FIG. 8. However, this announcement circuit is the first announcement circuit in the second group of 16 circuits (i.e., ANM002, ANM018 etc.). Accordingly, decoder D26 in FIG. 7 generates an enable pulse on lead AADB2 to gate the data and time slot information into announcement data transmitter ADT2 (not shown). During time slot 3, the first announcement circuit in the third group is served and so on for time slots 4–15. Time slot 16 is not used by an announcement circuit. Time slot 17 is used to service the second announcement circuit in the first group (i.e., ANM017). For time slot 17, decoder D26 enables lead AADB1 to enable ADT1 and MDR1. Then, decoder D27 enables lead ANM17 to activate ANM017. Time slot 18 is used to service the second announcement circuit is group two (i.e., ANM018) and so on. Thus, in this time slot assignment, each announcement data transmitter receives 40 bits of data every 16 time slots.

In summary each announcement circuit is assigned a distinct time slot in which it receives 40 bits of serial announcement information. Microprocessor MPO every base period of 512 ms loads the then standby recirculating shift resigters RSROA or RSROB with the base addresses identifying the vocabulary words which are being conveyed to the respective announcement circuits during the next base period. Each time frame number, the base address for each announcement circuit is incremented by one so that the next data word in the particular vocabulary word identified by the base address is applied by an anouncement circuit served during the instant time slot.

As mentioned previously in regard to FIG. 1, if a coin detector detects a start of a sequence of coin deposit tones during an announcement, the announcement is immediately terminated. It should be apparent that the microprocessor can control the selection of vocabulary words only once every 512 ms. Thus to immediately terminate an announcement, additional hardware is provided in each announcement circuit which forces the application of alternate 1s and 0s to the converter in that announcement circuit. For example with reference to FIG. 8, assume that coin detector CTD1 detected to start of a coin deposit. The detector applies a HIGH signal to the clock input of flip-flop FFIN via lead PX. This sets the flip-flop causing the Q output to go HIGH. Responsive to this HIGH signal, switch SWX accepts information from the $\overline{Q}$ output of flip-flop FFON rather than from memory AFIFO. Thus flip-flop FFON inverts whatever signal is input thereto on its $\overline{Q}$ output. Accordingly, a continuous sequence of 1s and 0s is applied to converter DOG so that the converter is effectively silenced.

Each 16 time slots, the information stored in each of the announcement data transmitters ADT-, announcement data receivers ADR- and announcement circuits ANM- must be cleared so that the announcement circuits receive the proper data next time their corresponding time slot arrives. To accomplish this function, end-of-message decoder EMD in FIG. 7 is responsive to the termination of 1-MHz clock signals received from bus driver ACR1 via gate G211. This 1 MHz clock signal terminates after the 48 data bits in buffer ADB1 are transmitted. Responsive to this termination the decoder generates a HIGH output on lead CLEAR to clear register RRL, decoder D27, and registers RR2 in each of the announcement circuits ANM0-01-ANM016.

As mentioned previously, the announcements circuits are not duplicated. A set of switches is provided in each announcement circuit to accept information from either the announcement data receiver associated with microprocessor MPO or the announcement data receiver associated with microprocessor MP1. For example with reference to announcement circuit ANM001 in FIG. 8, switches HS1–HS4 are configured by the SPC to only accept information from the active microprocessor MPO (i.e., here announcement data receiver ADR1). When the active-standby designations are changed, these switches are reconfigured to accept information from the "new" active microprocessor.

INTERROGATION OF COIN TONE DETECTORS

As mentioned previously in regard to FIG. 1, coin tone detectors CTD001–CTD240 are provided to independently detect coin tones associated with the deposit of coins at a coin station connected thereto via the TSPS network. Unlike the announcement circuits discussed previously, the coin tone detectors are not interrogated on a time slot basis. Rather the coin tone detectors are individually interrogated under control of microprocessor MPO in FIG. 5. More specifically, end of the coin tone detectors in coin circuits presently being used are interrogated at least twice every half second. This rate is sufficiently fast to detect each of the groups of coin tones associated with the deposit of several coins.

Figure 10:
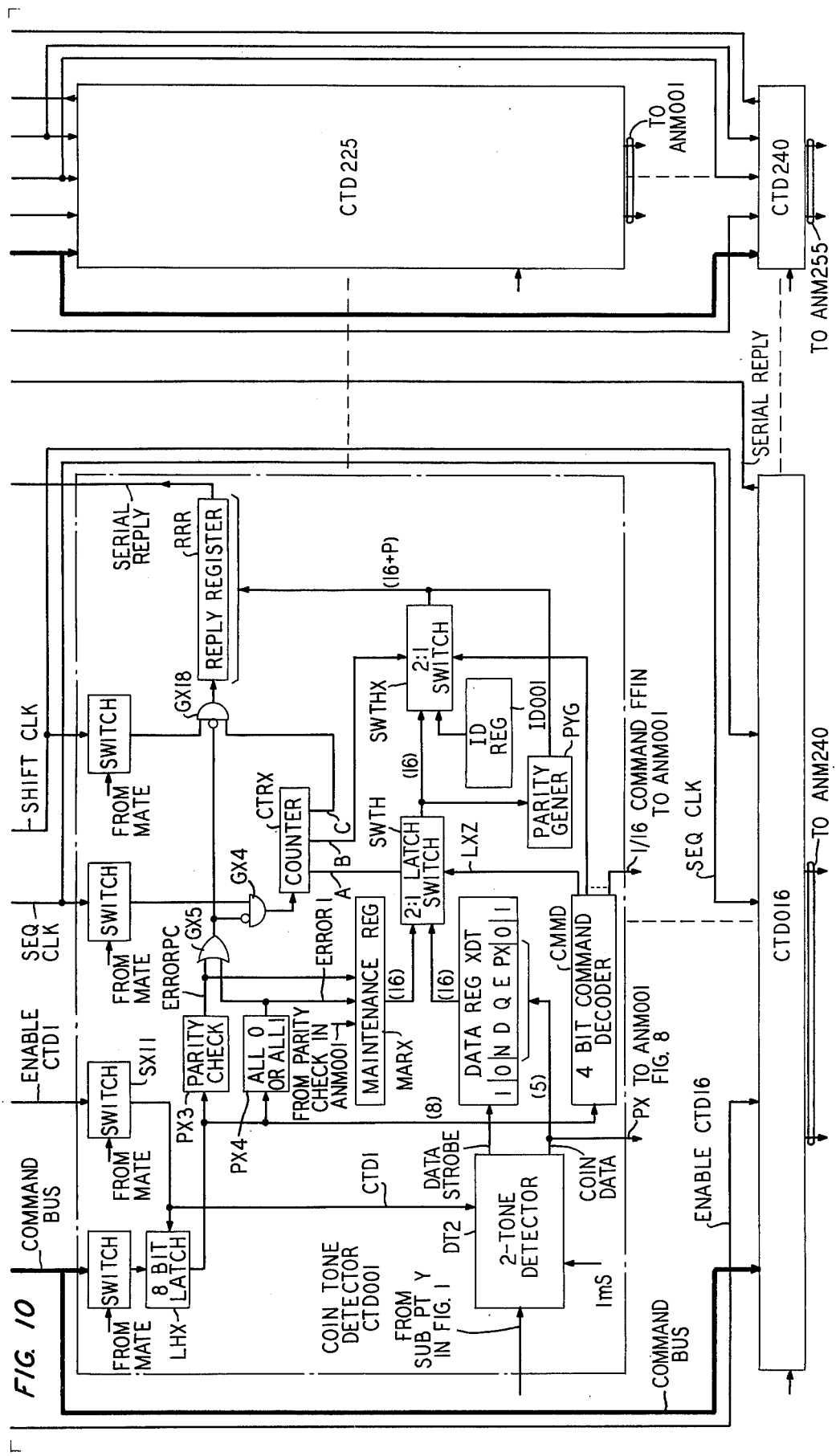

With reference to FIG. 10, the coin tone detectors are organized in a 16 × 15 matrix. Sixteen coin tone detectors are provided in each of 15 groups. Each group of sixteen detectors is served by a receiver group enable transmitter RGE-, coin detector enable receiver CDER-, coin information transmitter CIF- and a coin information receiver CIR-. The enable transmitter RGE- and enable receiver CDER- are adapated to receive address and command information from the input bus IBO and apply this information to a specified detector CTD-. The coin information transmitter CIF- and coin information receiver CIR- are adapted to return interrogated coin deposit information or maintenance information from the specified detector back to the microprocessor via input bus IBO.

More specifically, to interrogate a specified coin detector such as CTD001, microprocessor MPO loads a 16-bit data word plus parity onto output bus OBO in FIG. 5. This word is conveyed over cable C11 to register BFF1 in FIG. 9. The 16 data bits are organized into a 7-bit command, a 4-bit circuit address, and a 4-bit group address. The 4-bit group address, as mentioned hereinafter, identifies one of the 15 groups of coin detectors and the 4-bit circuit address identifies one of the 16 coin tone detectors in the identified group. The 4-bit group address is also applied via lead C11 to one-out-of-16 decoder DCD1, which generates an output pulse on a selected one of its output leads to enable one of the gates GX1–GX15 depending upon the specified group.

The contents of register BFFI comprise 24 bits in bit positions designated 1–24 (on top of register). Shift pulses are applied to register BFFI at a 2.5 MHz rate by gate GZA. The information serially output from register BFFI is applied to each of the gates GX1–GX15 but is output by only the single enabled gate. Here we will assume that coin tone detector CTD001 is being interrogated. Accordingly, the 4-bit group address will specify group 1 and gate GX1 will be enabled to receive and output the serial word in register BFF1. Each time a 1 is output from register BFF1, counter CUN20 is reset. This counter is not able to count to 20 to disable gate GZA until twenty 0s have been output from register BFF1 after the transmission of the 24 data bits. To elaborate, the left-hand input of register BFF1 is tied to ground and a 0 is inserted in the left-hand bit position of this register each time a shift pulse is applied thereto from gate GZA and the contents of register BFF1 are shifted one bit position to the left. Thus when bit 24 which is a 1 is output from register BFF1, counter CUN20 is reset. Since all 0s follow the 1 in bit position 24, counter CUN20 will not be reset again; therefore, after the twentieth 0 is output, counter CUN20 disables gate GZA and no further information is output to the enables transmitter RGE1.

AC serial bus driver DRGE1 outputs the serially 24 data bits and 20 0s from BFF1 to AC serial bus receiver DRER1 over an AC bus at the 2.5 MHz rates. This bus allows the coin tone detectors, and enable receivers, to be physically disassociated from microprocessor MPO.

Figure 9:
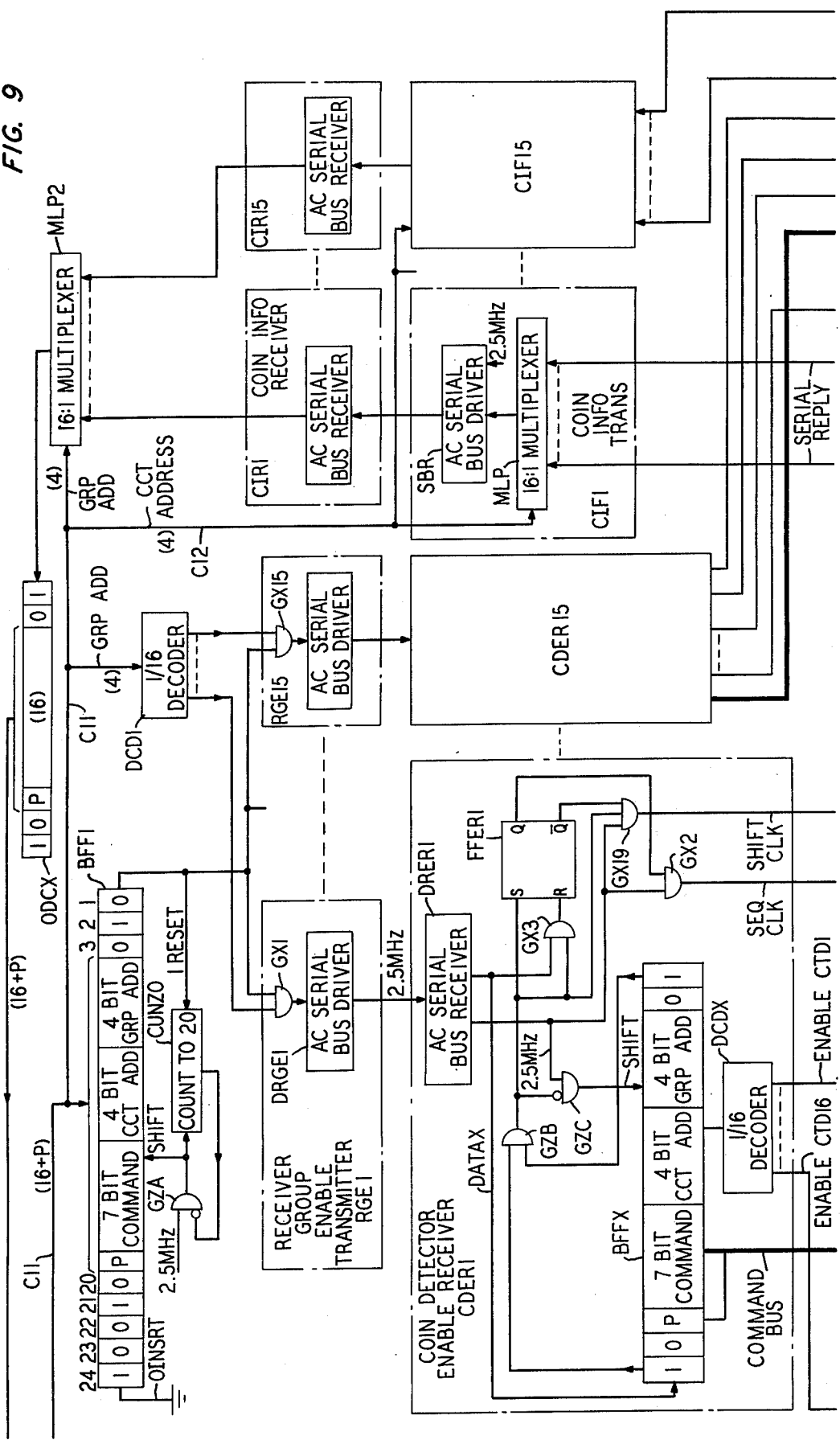

As serial bus receiver DRER1 receives the AC information and serially applies the binary information over lead DATAX to shift register BFFX, 2.5 MHz clock signals are applied to register BFFX by gate GZC to shift in the data on lead DATAX. When the 21st bit is received, the contents of register BFFX will appear as shown in FIG. 9. (Note, the leading 0 in register BFF1 is shifted out of register BFFX). The first one and the last one in register BFFX enable gate GZB to generate a HIGH output which disables gate GZC. This prevents the application of any further 2.5 MHz shift pulses to register BFFX.

One-out-of-16 detector DCDX decodes the 4-bit circuit address and generates a HIGH output on one of the enable leads CTD1–CTD16. Here we will assume that this decoder enables lead CTD1 because the circuit address specifies 1 since coin tone detector CTD001 is being interrogated. The 7-bit command and parity bit are applied from register BFFX to coin tone detectors CTD001–CTD016 via the COMMAND bus. the enable signal on lead CTD1 passes through switch SX11 to set 8-bit latch LHX to receive the 7-bit command and parity bit from register BFFX. Coin tone detector CTD001 includes 4 switches which allow only one of the duplicated microprocessors MP0 or MP1 to input information into this coin tone detector. These switches are set by the central pulse distributor (not shown) and are assumed herein to be set so that information from microprocessor MP0 is utilized to interrogate the coin tone detector.

Parity check circuit PX3 computes parity over the 7-bit command and compares the computed parity with the received parity bit. If an error is detected, a HIGH indication is generated on output lead ERROPC and a 1 is inserted in a selected bit position of maintenance register MARX. Circuit PX4 also checks the 7-bit command and generates an error output on lead ERR01 if the information contains all of 0s or all 1s, which conditions are indicative of an error condition or a diagnostic check. This error indication on lead ERR01 also controls one of the bits in register MARX.

Two-tone detector DT2 comprises well-known logic for detecting dual frequency tones respectively having frequencies of 1700 and 2200 Hz. Detector DT2 also counts the number of approximately 20 ms to 100 ms dual frequency tone pulses to identify the particular coin deposit. One pulse is generated for a nickel, two pulses are generated for a dime, and five pulses are generated at the coin station for a quarter. Upon the initial detection of a coin tone and even prior to counting the number of pulses, detector DT2 generates a HIGH output on lead PX. Bit PX is inserted in data register XDT, and lead PX extends to the corresponding announcement machine ANM001 in FIG. 8. As mentioned previously, a HIGH signal on lead PX causes the announcement circuit to immediately terminate the instant announcement. Lead PX goes HIGH as soon as a coin tone is detected and even before the number of coin tones can be counted. Since the maximum period between coin tones is about one half-second, and since the maximum number of coin tones is five, decoder DT2 takes a maximum of about 3 or 4 seconds to determine the particular type of coin which was deposited. After this determination is made, detector DT2 enters a 1 in either bit positions N, D or Q in register XDT respectively to indicate a nickel, dime or quarter. Detector DT2 then generates a signal on lead DATASTROBE to actually gate this information into data register XDT. If a processing malfunction occurs and detector DT2 receives tones associated with the deposit of a second coin, prior to the interrogation of data register XDT by microprocessor MPO, detector DT2 also puts a 1 in the E bit in register XDT to indicate a multiple coin problem. When this occurs, microprocessor MPO informs the SPC of this situation and the SPC controls the coin trunk in the associated local office to return any deposited coins. Normally detector DT2 is reset by the enable signal on lead CTD1 prior to the detection of tones indicative of a second deposit.

The 7-bit command and parity bit stored in latch LHX are also applied to 4-bit command decoder CMMD. Three of the bits in the command are not utilized and only the remaining 4 bits are decoded to generate one-out-of-16 commands. These commands specify whether the information to be sent to the microprocessor will be the contents of maintenance register MARX, or the contents of data register XDT, or the contents of ID register ID001, which contents permanently identify coin tone detector CTD001.

Normally the microprocessor will specify that information from data register XDT is required. Accordingly, decoder CMMD generates a HIGH output on lead LXZ to enable two-to-one latch switch SWTH to gate therein and temporarily store the word in register XDT. Switch SWTH is also responsive to a clock signal received over lead A as hereinafter explained.

The sequence of gating operations in coin detector CTD001 comprises three phases corresponding to the 22d, 23d, and 24th bits in register BFFI in FIG. 9 (i.e., 001). To elaborate, when gate GZB in FIG. 9 detected the 21st bit received over the AC but as discussed previously, then gate GZC was disabled to prevent the further gating of information into register BFFX. Also, flip-flop FFER1 is set by the HIGH output of gate GZB. The Q output of this flip-flop goes HIGH enabling gate GX2 to gate the 2.5 MHz clock signals to the coin tone detectors in the first group via lead SEQCLK. Gate GX3 is enabled when the 1 in the 24th bit position in register BFFI is received. This gate generates a HIGH output to reset flip-flop FFER1. Thus this flip-flop is set on the 21st bit and reset on the 24th bit. Thus only three clock pulses are output over lead SEQCLK. These three clock pulses are received by gate GX4 in FIG. 10 and applied to counter CTRX, but only if the gate GX4 was not previously disabled by an error output from gate GX5, as previously mentioned. Responsive to the first clock pulse, corresponding to bit 22, counter CTR generates a HIGH output on lead A to latch switch SWTH, if this switch was previously enabled by detector CMMD over lead LXZ. Parity generator PYG generates parity over the information in switch SWTH and provides a parity bit as its output.

On the second clock pulse applied to counter CTRX corresponding to the 23d bit, lead B goes HIGH to enable 2:1 switch SWTHX. This switch has been previously configured by an output (or lack of an output) from decoder CMMD to accept inputs from either switch SWTH or ID register ID001 and apply such inputs in parallel to reply register RRR.

The third clock pulse, which corresponds to bit 24, causes counter CTRX to enable lead C which partially enables gate GX18. More specifically as mentioned previously, flip-flop FFER1 in FIG. 9 is reset by the output of gate GX3 during the 24th bit. Thus after the 24th bit, the $\overline{Q}$ output of the flip-flop goes HIGH, and the output of gate GZB remains HIGH as described previously. Gate GX19 gates the 20 clock pulses (received at 2.5 MHz) corresponding to the twenty 0s shifted out of register BFFI before counter CUN20 stopped the shifting. These 20 clock pulses are applied to lead SHIFTCLK by gate GX19. Gate GX18 and corresponding gates in each of the other tone detectors CTD001 through CTD016 further apply the 20 clock pulses to the corresponding reply registers such as RRR. The contents of register RRR are serially applied to lead SERIAL REPLY.

Sixteen-to-one multiplexer MLP in coin information transmitter CIF1 in FIG. 1 responsive to a 4-bit circuit address received over lead C12 (as stored by another register not shown) selects the serial information from the one coin tone detectors identified by the address. Here, information from register RRR is selected and applied to AC serial bus driver SBR. This driver transmits the serial information at a 2.5 MHz rate to the bus receiver in coin information receiver CIR1.

Sixteen-to-one multiplexer MLP2 responsive to the 4-bit group address received over lead C11 (as stored by another register not shown) selects one-out-of-fifteen data channels from receivers CIR1–CIR15. Here multiplexer MLP2 selects CIR1 because circuit 1 is identified and, accordingly, outputs the information originally output from data register XDT in coin tone detector CTD001. This information is serially applied to output register ODCX.

Microprocessor MPO then interrogates this register to receive the requested information from coin tone detector CTD001. Approximately 18 cycles or 18 $\mu$s are required from the time microprocessor MPO loads the address into register BFFI until the corresponding answer is received in register ODCX. This time is required for the serial transmission at 2.5 MHz of 44 data bits. During this time interval, microprocessor MPO performs other tasks.

If microprocessor MPO had wanted to receive the contents of maintenance register MARX, then the command received by detector CMMD in FIG. 10 would not have configured switch SWTH. The contents of register MARX would have been latched and later output by switch SWTH.

To interrogate ID register ID001 in FIG. 10 for maintenance purposes, the output of decoder CMMD would have configured switch SWTHX to accept information from register ID001. In both of these maintenance situations, the information would be transmitted and received by microprocessor MPO in the manner previously described in regard to interrogating data register XDT.

SUMMARY

It is apparent from the foregoing description that tone detector DT2 in FIG. 10 and announcement circuit ANM001 in FIG. 8 are beneficially isolated from each other by the hybrid circuit arrangement described in regard to FIG. 1. This segregation enables the coin detector to detect the deposit of coins during announcements. The detector also assists the operator in determining the values of deposited coins.

Although the invention and the numerous features thereof have been described in connection with a particular embodiment, it is to be understood that additional applications and embodiments which will be obvious to those skilled in the art are included within the spirit and scope of the invention.

What is claimed is:

1. In combination,
    generating means for generating voice announcements,
    detecting means for detecting distinct signals originating at a telephone station, and
    coupling means for coupling said generating means to a transmission path connectible to said telephone station to transmit said voice announcements thereover and for coupling said detecting means to said transmission path to detect said distinct signals received thereover from said telephone station,
    said coupling means including isolating means for isolating said detecting means from said generating means.

2. The combination according to claim 1 wherein said generating means comprises
    a memory storing binary announcement words,
    means for accessing said memory to retrieve announcement words therefrom, and
    means for converting said retrieved announcement words into voice announcements.

3. The combination according to claim 1 wherein said detecting means comprises
    means for detecting tones indicative of the deposit of a coin at said telephone station, and
    means for analyzing said tones to determine the value of the deposited coin.

4. The combination according to claim 1 wherein said coupling means comprises
    a network terminating said transmission path and also terminating leads extending to said isolating means, and
    control means for controlling said network to establish a connection between the termination of said transmission path and the termination of said leads.

5. The combination according to claim 4 wherein said isolating means comprises
    hybrid circuit means connected to said last named leads and applying signals received over said leads from said transmission path to a unidirectional path connected to said detecting means and applying signals received over another path connected to said generating means to said transmission path via said leads and said connection.

6. The combination according to claim 4 wherein said isolating means comprises
    a first hybrid circuit connected to said last-named leads,
    a second hybrid circuit connected to said generating means,
    said hybrid circuits being interconnected by a first unidirectional path also connected to said detecting means and a second unidirectional path, and
    said first hybrid circuit applies signals received over said leads from said transmission path to said first unidirectional path and applies signals received over said second unidirectional path to said leads and then to said transmission path, and
    said second hybrid circuit applies signals received over said first unidirectional path to said generating means and applies signals received from said generating means to said second unidirectional path.

7. the combination according to claim 6 further comprising
    an operator position terminated on said network, and
    a bidirectional path connecting said generating meand and said second hybrid circuit to a termination on said network, and wherein said control means controls said network to establish another connection between said last-mentioned terminations, whereby speech signals from an operator are applied to said transmission path via said other connection, said bidirectional path, said second hybrid circuit, said second unidirectional path, said first hybrid circuit, said leads and said connection, and whereby signals from said telephone station are received by the operator via said transmission path, said connection, said leads, said first hybrid circuit, said first unidirectional path, said second hybrid circuit, said bidirectional path and said other connection, and whereby speech signals from the operator do not interfere with the operation of said detecting means.

8. In combination,
generating means for generating voice announcements,
coupling means for coupling said generating means to a transmission path connectible to a telephone station to transmit said voice announcements thereover,
detecting means for detecting distinct signals received from said telephone station over said transmission path via said coupling means, and
isolating means connected to said coupling means for isolating said detecting means from said voice announcement generating means.

9. In an automated coin telephone system,
announcing means for generating voice announcements,
applying means connected to said announcing means for conveying said voice announcements to a communication path connectible to a calling coin station,
said applying means including receiving means for receiving voice signals and coin deposit signals conveyed over said communication path from said coin station and isolating means for segregating said voice announcements from said voice and coin deposit signals from said coin station, and
detecting means connected to said isolating means for monitoring said segregated voice and coin deposit signals and for detecting the presence of said coin deposit signals.

10. The system according to claim 9 wherein said announcing means comprises
memory means for storing binary announcement words,
means for accessing said memory to retrieve announcement words therefrom, and
means for converting said retrieted announcement words into voice announcements.

11. The system according to claim 9 wherein said applying means further includes a network, and a network controller for controlling said network to establish a network connection between said communication path and said isolating means.

12. The system according to claim 11 wherein said isolating means comprises hybrid circuit means applying said voice and coin deposit signals received over said communication path to a unidirectional path connected to said detecting means and applying said voice announcements from said generating means received over another path to said communication path via said network connection.

13. The system according to claim 11 wherein said isolating means comprises
a first hybrid circuit connected to said network connection via a first termination on said network,
a second hybrid circuit connected to said network via a second termination on said network, and
first and second unidirectional paths interconnecting said hybrid circuits,
said first hybrid circuit applying said voice and coin deposit signals received over said network connection to said first unidirectional path and applying signals received over said second unidirectional path to said network connection, said announcing means being connected to the connection between said second hybrid circuit and said second termination and said detecting means being connected to said first unidirectional path, and
said second hybrid circuit applying said voice announcements from said announcing means to said second unidirectional path.

14. The system according to claim 13 further comprising
an operator position terminated on said network and wherein
said network controller controls said network to establish a network connection from said operator position to said second termination, and whereon said second hybrid circuit also applies said voice and coin deposit signals on said first unidirectional path to said operator position via said second termination.

15. For use in a telephone traffic service position system including a network, an incoming communication line terminated on said network and connectible to a calling coin station, and a network controller for controlling said network to establish connections,
an automated coin subsystem comprising
a first hybrid circuit connected to a first termination on said network,
said network controller controls said network to establish a network connection from said incoming communication line to said first termination of said first hybrid circuit,
a second hybrid circuit connected to a second termination on said network via a bidirectional path,
said hybrid circuits being interconnected by first and second unidirectional paths therebetween, said first hybrid circuit applying signals received at said first termination to said first unidirectional path and applying signals received over said second unidirectional path to said first termination, and said second hybrid circuit applying signals received over said bidirectional path to said second unidirectional path and applying signals received over said first unidirectional path to said bidirectional path,
a tone detector connected to said first unidirectional path detects signals indicative of coin deposits applied thereto from said incoming communication line via said network connection, said first hybrid circuit and said first unidirectional path, and
announcement generator means for applying voice signals to said incoming communication line via said bidirectional path, said second hybrid circuits, said second unidirectional path, said first hybrid circuit, and said network connection.

16. The service position system according to claim 15 further including an operator position terminated on said network and wherein said network controller also controls said network to establish a network connection between said operator position and said second termination of said second hybrid circuit, whereby an operator can communicate with a subscriber at the calling coin station without interfering with the detection of coin deposit tones by said tone detector.

17. For use in the service position system according to claim 15 further comprising a first data processing unit for controlling said network controller, said automated coin subsystem further comprising a second data processing unit interogating said tone detector to ascertain the value of any coin deposits detected thereby, a memory storing binary announcement words, said second data processing units controls the accessing of said memory to retrieve announcement words therefrom, said announcement generator means includes converter means for converting said retrieved announcement words into voice announcements, and said second data processing unit informs said first data processing unit when the detected coin deposit equals or exceeds the requisite deposit.

18. In combination, means for detecting tones representative of the deposit of coins at a coin telephone station, means for generating announcements for the coin telephone station, a first hybrid circuit, a second hybrid circuit, first and second unidirectional communication paths between said hybrid circuits, means connecting said tone detecting means to said first path extending from said first hybrid circuit to said second hybrid circuit, means connecting said announcement generating means to said second hybrid circuit for transmission of announcements over said second communication path extending from said second hybrid circuit, to said first hybrid circuit, and control means for controlling said tone detecting means and said announcement generating means.

19. In combination for connection to paths from a coin telephone station, means for detecting tones representative of the deposit of coins at the station, means for formulating announcements for transmission to the station, and hybrid circuit means for isolating announcements from said announcement formulating means from said tone detecting means whereby a proper deposit of coins can simultaneously be detected by said tone detecting means during operation of said announcement formulating means.

* * * * *

UNITED STATES PATENT AND TRADEMARK OFFICE
CERTIFICATE OF CORRECTION

PATENT NO. : 4,031,324

DATED : June 21, 1977

INVENTOR(S) : Ronald M. Dudonis

Page 1 of 2

It is certified that error appears in the above-identified patent and that said Letters Patent are hereby corrected as shown below:

Column 2, line 8, "coil" should read --coin--; line 13, "coil" should read --coin--; line 29, "and" should read --the--; line 41, "coil" should read --coin--; line 43, "coil" should read --coin--; line 52, "coil" should read --coin--. Column 3, line 17, "coil" should read --coin--; line 18, "hybird" should read --hybrid--; line 30, "hybird" should read --hybrid--. Column 4, line 10, "memeory" should read --memory--; line 31, "flowcart" should read --flowchart--; line 34, "illustrates" should read --illustrate--; line 35, after "coin", the word --calls-- should be inserted; line 51, "Prior Art TSPS System" should be a heading and not italicized; line 62, "according" should read --accordance--; line 64, "menner" should read --manner--; line 65, "tsps" should read --TSPS--; line 67, "to" should read --is--. Column 5, line 4, "P14" should read --P4--; line 12, "what" should read --when--; line 26, "changes" should read --charges--; line 37, "coil" should read --coin--; line 42, "coil" should read --coin--; line 48, "offices" should read --office--; line 60, "microprocessor" should read --microprocessors--. Column 6, line 27, after "determines", --whether-- should be inserted; line 38, "hybird" should be --hybrid--; line 49, "form" should read --from--. Column 7, line 15, "coil" should read --coin--. Column 8, line 27, "the" should read --with--; line 37, "diming" should read --timing--. Column 9, line 32, "TSPS-ACTS" should read --TSPS-ACT--. Column 13, line 32, the comma should be a period. Column 16, line 24, "principle" should read --principal--; line 31, "the the" should read --the--; line 42, after "from", the word "the" should be deleted; line 50, "standy" should read --standby--; line 54, "MFB," should read --MFB_,--; line 55, "MFB," should read

UNITED STATES PATENT AND TRADEMARK OFFICE
CERTIFICATE OF CORRECTION

PATENT NO. : 4,031,324

DATED : June 21, 1977

Page 2 of 2

INVENTOR(S) : Ronald M. Dudonis

It is certified that error appears in the above-identified patent and that said Letters Patent are hereby corrected as shown below:

--MFB_,--. Column 18, line 59, "structurely" should read --structurally--. Column 19, line 56, "please" should read --Please--. Column 20, line 37, after "on", the word --lead-- should be inserted; line 40, "MOP" should read --MPO--. Column 21, line 41, "acces" should read --access--; line 44, "The" should read --These--. Column 22, line 30, "AIFIO" should read --AFIFO--; line 49, "is" should read --in--. Column 23, line 57, "end" should read --each--. Column 24, line 51, after "from", the word --register-- should be inserted. Column 25, line 7, "the" should read --The--. Column 26, line 66, "FIG. 1" should read --FIG. 9--. Column 28, line 52, "the" should read --The--; line 56, "meand" should read --means--. Column 29, line 41, "retrieted" should read --retrieved--. Column 30, line 15, "whereon" should read --wherein--. Column 31, line 1, "interogating" should read --interrogating--.

Signed and Sealed this

Fifteenth Day of November 1977

[SEAL]

Attest:

RUTH C. MASON
*Attesting Officer*

LUTRELLE F. PARKER
*Acting Commissioner of Patents and Trademarks*